(12) United States Patent
Parra et al.

(10) Patent No.: US 9,206,684 B2
(45) Date of Patent: Dec. 8, 2015

(54) ARTIFICIAL LIFT EQUIPMENT POWER LINE COMMUNICATION

(71) Applicant: Schlumberger Technology Corporation, Sugar Land, TX (US)

(72) Inventors: Luis Parra, Singapore (SG); Fraz Ahmad Kharal, Singapore (SG); Jostein Fonneland, Singapore (SG); John A. Booker, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 259 days.

(21) Appl. No.: 13/666,892

(22) Filed: Nov. 1, 2012

(65) Prior Publication Data

US 2014/0118158 A1 May 1, 2014

(51) Int. Cl.
| | | |
|---|---|---|
| G01V 3/00 | (2006.01) | |
| E21B 47/12 | (2012.01) | |
| H04B 3/54 | (2006.01) | |
| E21B 43/12 | (2006.01) | |

(52) U.S. Cl.
CPC *E21B 47/12* (2013.01); *H04B 3/54* (2013.01); *H04B 3/542* (2013.01); *E21B 43/128* (2013.01); *H04B 2203/5416* (2013.01); *H04B 2203/5458* (2013.01); *H04B 2203/5475* (2013.01)

(58) Field of Classification Search
CPC .............. H04B 2203/5475; H04B 2203/5466; H04B 2203/5458; H04B 2203/547; H04B 3/54; E21B 1/00; E21B 10/00
USPC ....................... 340/854.9, 853.3, 855.8, 855.9
See application file for complete search history.

(56) References Cited

U.S. PATENT DOCUMENTS

| | | | |
|---|---|---|---|
| 4,631,536 A | 12/1986 | Ward et al. | |
| 5,515,038 A | 5/1996 | Smith | |
| 5,521,592 A | 5/1996 | Veneruso | |
| 5,539,375 A | 7/1996 | Atherton | |
| 5,844,949 A | 12/1998 | Hershey et al. | |
| 6,188,552 B1 | 2/2001 | Jaeschke et al. | |
| 6,191,500 B1 * | 2/2001 | Toy ................................ | 307/64 |
| 6,329,905 B1 | 12/2001 | Cunningham | |
| 6,396,415 B1 | 5/2002 | Bulmer | |
| 6,407,987 B1 | 6/2002 | Abraham | |
| 6,587,037 B1 | 7/2003 | Besser et al. | |
| 7,268,670 B2 | 9/2007 | Robertson | |

(Continued)

FOREIGN PATENT DOCUMENTS

| | | |
|---|---|---|
| GB | 2431081 | 4/2007 |
| WO | 01/03323 | 1/2001 |
| WO | 2008/102170 | 8/2008 |

OTHER PUBLICATIONS

Search report for the equivalent GB patent application No. 1318823.0 issued on Apr. 7, 2014.

*Primary Examiner* — Ojiako Nwugo

(57) ABSTRACT

A system can include a transformer and a rectifier to derive DC power from AC power at a wye point of an electric motor; a sensor that includes a sensor signal output to output a sensor signal; a telemetry driver that includes a DC power input to receive the derived DC power and that includes an input to receive the sensor signal and an output to output a data signal representing the sensor signal; and circuitry to deliver the data signal representing the sensor signal to the wye point of the electric motor. Various other apparatuses, systems, methods, etc., are also disclosed.

11 Claims, 11 Drawing Sheets

(56) References Cited

U.S. PATENT DOCUMENTS

| | | | |
|---|---|---|---|
| 7,750,495 B2 * | 7/2010 | Wu et al. .......................... 307/1 |
| 7,904,108 B2 * | 3/2011 | Castaneda et al. ......... 455/550.1 |
| 7,982,633 B2 | 7/2011 | Booker et al. |
| 2005/0190584 A1 | 9/2005 | Hernandez et al. |

* cited by examiner

Geologic Environment 200

ARTIFICIAL LIFT EQUIPMENT POWER LINE COMMUNICATION

BACKGROUND

Artificial lift equipment such as electric submersible pumps (ESPs) may be deployed for any of a variety of pumping purposes. For example, where a substance does not readily flow responsive to existing natural forces, an ESP may be implemented to artificially lift the substance. To receive power, an ESP is connected to a cable or cables. In some instances, the length of such a cable or cables may be of the order of several kilometers. A cable may also include one or more motor lead extensions (MLEs) spliced onto the cable. For example, where the cable includes three conductor cores for powering a motor, a MLE may be spliced onto each of the conductor cores. Length of a MLE may be, for example, on the order of a few meters to ten meters or more.

Some examples of available ESP cables include those rated at 3 kV, 4 kV or 5 kV. As to configurations, ESP cables may utilize a round cable configuration, a flat cable configuration or other cable configuration. For example, a round cable may be used where sufficient space exists in a wellbore and a flat cable may be used where clearance issues exist or to prevent clearance issues in a wellbore.

A power cable may provide for delivery of power and transmission of data. For example, data may be communicated between one end of a 3-phase electrical power cable (e.g., where an electrical motor is installed downhole) and another end of the 3-phase electrical power cable (e.g., where an electrical power source is located uphole). In such an example, data generated by downhole equipment (e.g., a sensor gauge, etc.) may be transmitted via the 3-phase electrical power cable to uphole data handling equipment. As an example, a 3-phase electrical power cable may also deliver power to downhole equipment.

Where a 3-phase electrical power cable provides for delivery of power, optionally to more than one piece of equipment, and provides for transmission of data, a ground fault of one or more of the power cable conductors can interrupt delivery of power, transmission of data, or both delivery of power and transmission of data. Various technologies, techniques, etc., described herein pertain to delivery of power, transmission of data, etc.

SUMMARY

A system can include a transformer and a rectifier to derive DC power from AC power at a wye point of an electric motor, a sensor to output a sensor signal, a telemetry driver powered by the DC power and to receive the sensor signal and to output a data signal representing the sensor signal, and circuitry to deliver the data signal representing the sensor signal to the wye point of the electric motor. A method can include receiving an AC power signal at a wye point of an electric motor, deriving DC power from the AC power signal, powering circuitry using the derived DC power, and applying a data signal to the wye point using the circuitry. A system can include a pump with an electric motor and a wye point, a power cable connected to the electric motor, a telemetry driver powered by DC power, a sensor, and a transformer with where one winding passes DC power from the wye point to power the telemetry driver and another winding acts in stepping down AC power from the wye point for conversion to DC power to power the telemetry driver. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
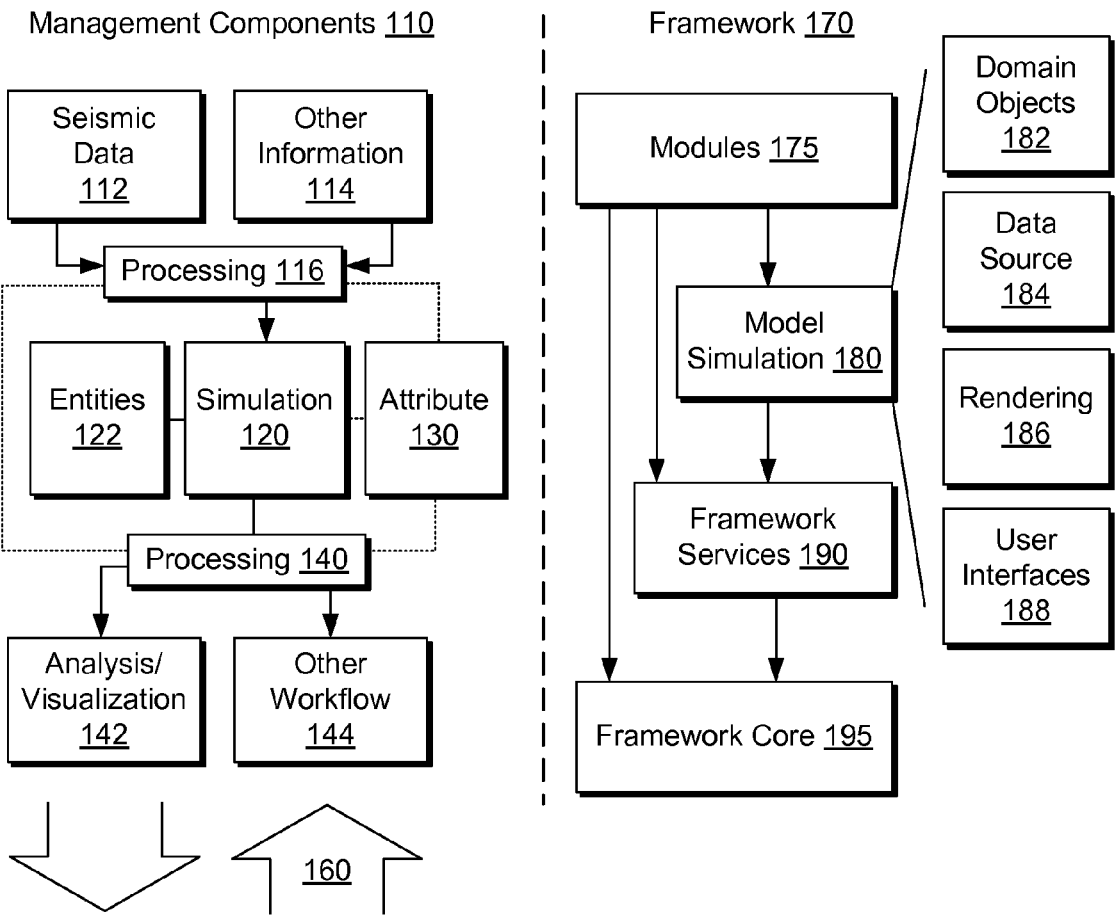
FIG. 1 illustrates an example system that includes various components for simulating and optionally interacting with a geological environment.
Figure 1:
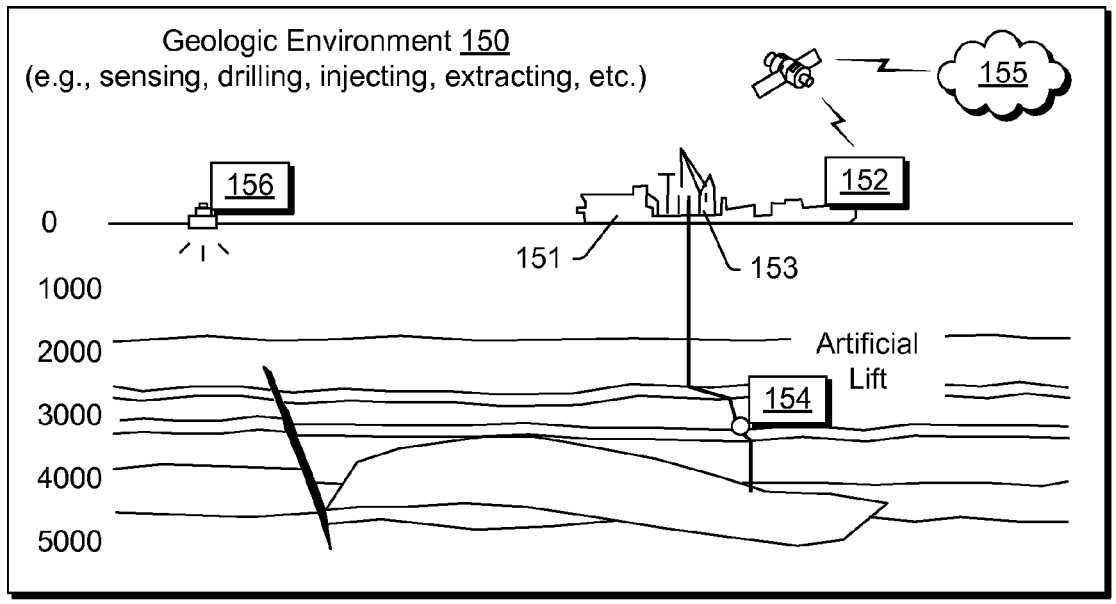

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Electric submersible pumps (ESPs) may be deployed for any of a variety of pumping purposes. For example, where a substance does not readily flow responsive to existing natural forces, an ESP may be implemented to artificially lift the substance. Commercially available ESPs (such as the REDA™ ESPs marketed by Schlumberger Limited, Houston, Tex.) may find use in applications that include, for example, pump rates in excess of 4,000 barrels per day and lift of 12,000 feet or more.

ESPs have associated costs, including equipment costs, replacement costs, repair costs, and power consumption costs. To assist with selection of ESP specifications, a manufacturer may provide a plot with a pump performance curve that defines an optimal operating range for a given pump speed and fluid viscosity. Such a plot may include a head-capacity curve that shows amount of lift per pump stage at a given flow rate, a horsepower requirements curve across a range of flow capacities, and a pump efficiency curve, for example, calculated from head, flow capacity, fluid specific gravity and horsepower. As an example, an ESP may be specified as having a "best efficiency point" (BEP) of about 77% for a flow of about 7,900 barrels per day, a head of about 50 feet and a horsepower of about 3.7 for a fluid specific gravity of 1.0 (e.g., REDA™ 538 Series, 1 stage at 3,500 RPM at 60 Hz). An ESP may be specified with a lift per stage such that a number of stages may be selected for an application to meet lift requirements.

An ESP or other downhole equipment may include one or more electric motors. A motor may be driven, for example, via a 3-phase power supply and a power cable or cables that provide a 3-phase AC power signal. As an example, an ESP motor may be coupled to a 3-phase power signal via a balanced inductor network having a neutral, ungrounded node, which may be referred to as a "wye node" or "wye point" of the ESP motor. Voltage and current levels of the 3-phase AC power signal provided by a power supply to an ESP motor may be, for example, of the order of several kilovolts and tens of amperes and oscillate at a frequency of the order of about 60 Hz.

Adjustments may be made to an ESP, for example, where the ESP is outfitted with a variable-speed drive (VSD) unit. A VSD unit can include an ESP controller such as, for example, the UniConn™ controller marketed by Schlumberger Limited (Houston, Tex.). In combination, a VSD unit with an ESP controller allows for variations in motor speed, which may better manage power, heat, etc.

As an example, an ESP may include one or more sensors (e.g., gauges) that measure any of a variety of phenomena (e.g., temperature, pressure, vibration, etc.). A commercially available sensor is the Phoenix MultiSensor™ marketed by Schlumberger Limited (Houston, Tex.), which monitors intake and discharge pressures; intake, motor and discharge temperatures; and vibration and current-leakage. An ESP monitoring system may include a supervisory control and data acquisition system (SCADA). Commercially available surveillance systems include the espWatcher™ and the LiftWatcher™ surveillance systems marketed by Schlumberger Limited (Houston, Tex.), which provide for communication of data, for example, between a production team and well/field data equipment (e.g., with or without SCADA installations). Such a system may issue instructions to, for example, start, stop or control ESP speed via an ESP controller.

As to power to power a sensor (e.g., an active sensor), circuitry associated with a sensor (e.g., an active or a passive sensor), or a sensor and circuitry associated with a sensor, a DC power signal may be provided via an ESP cable and available at a wye point of an ESP motor, for example, powered by a 3-phase AC power signal. Where sufficient balance exists between the three phases of the AC power signal, the DC power signal may be sufficient for demands of one or more sensors, associated circuitry, etc. However, as explained further below, where unbalance exceeds some reasonable level, the DC power signal may become "contaminated" (e.g., alternating at one or more frequencies) and be unsuitable for powering one or more sensors, associated circuitry, etc. While a sensor, associated circuitry, etc., may include an integral voltage regulator for regulating a DC supply signal, where unbalance exists, the nature of the signal reaching the integral voltage regulator may be insufficient to produce sustainable DC power.

Transmission of data, or communication of data, may be, at times, referred to as telemetry. Telemetry circuitry may be circuitry associated with one or more sensors, for example, to transmit data uphole, downhole or uphole and downhole (e.g., sensed data, data about sensor status, data based at least in part on sensed data, etc.). As an example, a telemetry process may include multiplexing a low power communication signal on high voltage, high current electrical circuitry that energizes a downhole motor. In such an example, DC power may be delivered to electrical circuitry or derived from the electrical circuitry to energize downhole equipment other than the downhole motor. For example, as mentioned, DC power may be delivered in a manner where downhole equipment can tap the DC power at a wye point of a downhole motor energized by three conductors of a power cable that carry 3-phase power. As another example, a secondary AC power signal may be delivered via a power cable in a manner such that the secondary AC power signal exists at the wye point. Such a secondary AC power signal may be smaller in terms of voltage and current (e.g., overall power) than a primary 3-phase AC power signal for powering a motor of an ESP. As yet another example, a choke electrically connected to a wye point may provide for a DC power signal based on a small fraction of "normal" unbalance in a 3-phase AC power signal (e.g., phase unbalance of a few percent). As an example, where a piece of downhole equipment is powered by a DC power signal, the secondary AC power signal may be converted to DC power signal.

As an example, a power cable may provide for delivery of power to an ESP, other downhole equipment or an ESP and other downhole equipment. Such a power cable may also provide for transmission of data to downhole equipment, from downhole equipment or to and from downhole equipment.

Where data is transmitted via a power cable from a "remote" location to a base or other "local" location, the data transmission process may be part of a remote monitoring process. For example, where a downhole electric motor is supplied with 3-phase power via a power cable, a downhole sensor may tap into a wye point of the electric motor to transmit data via the power cable. A remote monitoring process may, for example, monitor various parameters associated with downhole equipment operation, physical phenomena, etc. Such monitoring may facilitate operation of downhole equipment or other equipment (e.g., by an operator, a controller, etc.). For example, as to a downhole ESP, remote monitoring may provide for knowledge of actual values of well parameters related to surrounding reservoir or well bore fluids. A link to communicate monitored data from downhole to uphole may economically be implemented using the same power cable that delivers the electrical power to one or more motors of the ESP (e.g., noting that such a link may be used in a reverse manner to transmit data (e.g., control instructions, etc.) to downhole equipment (e.g., an ESP, a sensor, etc.)).

As mentioned, a power cable may be subject to a fault such as a ground fault. Depending on the nature of the fault, as an example, a fault may be classified as an uphole fault or a downhole fault. Further, a fault may stem from equipment and not a power cable itself. As to a "ground" fault, it is a type of fault that occurs when one or more conductors are inadvertently grounded (e.g., temporarily or permenantly). For a power cable, erosion of insulation about a conductor may give rise to a ground fault. For equipment to which a power cable is electrically connected, mechanical damage to the equipment may cause a conductor or a conductive component to become inadvertently grounded (e.g., temporarily or permanently).

As to issues associated with ESP operations, a power supply may experience unbalanced phases, voltage spikes, presence of harmonics, lightning strikes, etc., which may, for example, increase temperature of an ESP motor, a power cable, etc.; a motor controller may experience issues when subjected to extreme conditions (e.g., high/low temperatures, high level of moisture, etc.); an ESP motor may experience a short circuit due to debris in its lubricating oil, water breakthrough to its lubricating oil, noise from a transformer which results in wear (e.g., insulation, etc.), which may lead to lubricating oil contamination; and a power cable may experience a issues (e.g. short circuit or other) due to electric discharge in insulation surrounding one or more conductors (e.g., more probable at higher voltages), poor manufacturing quality (e.g., of insulation, armor, etc.), water breakthrough, noise from a transformer, direct physical damage (e.g., crushing, cutting, etc.) during running or pulling operations), chemical damage (e.g., corrosion), deterioration due to high temperature, current above a design limit resulting in temperature increase, electrical stresses, etc.

As an example, where an ESP 3-phase power cable develops a fault (e.g., temporarily or permanently) in the form of a current leakage path to ground on one of the power conductors, current carried by that conductor is conducted to ground through that path. In such a scenario, some current carried over the other conductors of the power cable may be conducted to ground via the current leakage path as well, for example, by flowing through the motor windings and into the conductor associated with the current leakage path. However, as impedance of the motor windings is non-zero (e.g., of the order of hundreds of ohms or more), current that flows through the motor windings to the conductor associated with the current leakage path may be limited.

When a 3-phase power circuit for a motor experiences a ground or phase fault, as an example, a wye point may carry an AC voltage that may be a large fraction of the motor supply voltage. For example, assuming a 3% normal phase unbalance, a wye point of an ESP motor may be about 45 VAC for a 1.5 kV motor and 120 VAC for a 4 kV motor. At 70 Hz a nominal 500 H choke has about 250 kohms impedance rising to about 1 mohm at 30 Hz (e.g., a choke with high frequency bypass capacitors). Assuming a 250 ohm resistive or inductive connection to ground via a unit electrically connected to the wye point of the ESP motor, that unit may see a nominal voltage of about 100 VDC and almost no AC component (e.g., 0 VAC). The foregoing example demonstrates how the aforementioned choke may provide for a DC power signal via a tap to a wye point of an ESP motor where some "normal" phase unbalance exists. However, where a ground or phase fault condition exists, the wye point may rise to a large fraction (e.g., about 70%) of the phase voltage. For example, in a worst case scenario, the wye point may carry several kilovolts RMS (e.g., at about 30 Hz) for a 4 kV motor. In such an example, the unit electrically connected to the wye point of the ESP motor may see about 0 VDC, assuming the supply is effectively short circuited (e.g., and a couple of volts RMS after the choke). The actual level experienced by a unit electrically connected to a wye point of a motor may depend upon the nature of the condition or conditions. Accordingly, a ground fault (e.g., or phase fault or "phase-to-ground" fault) may impact the nature of a signal or signals carried at a wye point of a motor. Such a fault may be temporary or permanent. For example, depending on cause(s), a ground fault may dispate and later reappear or exhibit other transient behavior. During periods where a ground fault does not exist, as an example, circuitry may respond automatically to "switch" from one operational mode to another with respect to powering one or more sensors, associated circuitry, etc. For example, a circuit may determine quality of a DC power signal supplied via uphole equipment via a downhole power cable (e.g., based on one or more characteristics of the DC power signal). Such a circuit may optionally be selected or programmable based on a sensor, telemetry circuitry, etc. For example, such a circuit may be triggered by a sensor entering an acquisition mode, a telemetry circuity entering a communication mode, etc.

As an example, a circuit may be configured to determine that, even though a ground fault issue exists, some form of DC power signal remains and that equipment to be powered by DC power can use the remaining DC power, for example, with some amount of supplementation (e.g., via an AC to DC conversion). Where supplementation of a provided DC power signal occurs using an AC power signal (or signals), one ground fault state may be deemed a mixed DC/AC state (e.g., equipment powered via a mix of DC and DC derived from AC); whereas, for example, where the DC power signal is unsuitable, another ground fault state may be deemed an AC state (e.g., equipment powered via DC derived from AC). As an example, where a ground fault does not exist (e.g., unfaulted or non-ground fault state), a state may be deemed a DC state (e.g., equipment powered via DC supplied from an uphole power source via a power cable).

As an example, circuitry may be provided for use downhole that electrically connects to a wye point of an electric motor where the circuitry may derive power to power a unit (or units) via one or more AC power signals carried by the wye point even in the presence of a ground fault or faults. Such circuitry may also provide for telemetry (e.g., via a transformer, a capacitor, a transformer and a capacitor, etc.). Further, such circuitry may provide for reliable telemetry even where an environment is considered noisy.

To understand better how downhole equipment fits into an overall strategy, some examples of processes are described below as applied to basins and, for example, production from one or more reservoirs in a basin.

FIG. 1 shows an example of a system 100 that includes various management components 110 to manage various aspects of a geologic environment 150 such as a basin that may include one or more reservoirs. For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the geologic environment 150 may be outfitted with any of a variety of sensors, detectors, actuators, ESPs, etc. For example, equipment 152 may include communication circuitry to receive and to transmit information with respect to one or more networks 155. Such information may include information associated with downhole equipment 154 (e.g., an ESP), which may include equipment to acquire information (e.g., one or more sensors, etc.), to assist with resource recovery, etc. Other equipment 156 may be located remote from a well site and include sensing, detecting, emitting or other circuitry. Such equipment may include storage and communication circuitry to store and to communicate data, instructions, etc.

As to the management components 110 of FIG. 1, these may include a seismic data component 112, an information component 114, a pre-simulation processing component 116, a simulation component 120, an attribute component 130, a post-simulation processing component 140, an analysis/visualization component 142 and a workflow component 144. In operation, seismic data and other information provided per the components 112 and 114 may be input to the simulation component 120, optionally with pre-simulation processing via the processing component 116 and optionally with post-simulation processing via the processing component 140.

According to an embodiment, the simulation component 120 may rely on entities 122. Entities 122 may be earth entities or geological objects such as wells, surfaces, reservoirs, etc. In the system 100, the entities 122 may include virtual representations of actual physical entities that are reconstructed for purposes of simulation. The entities 122 may be based on data acquired via sensing, observation, etc. (e.g., the seismic data 112 and other information 114).

According to an embodiment, the simulation component 120 may rely on a software framework such as an object-based framework. In such a framework, entities may be based on pre-defined classes to facilitate modeling and simulation. A commercially available example of an object-based framework is the MICROSOFT™ .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may be a library of attributes. Such processing may occur prior to input to the simulation component 120. Alternatively, or in addition to, the simulation component 120 may perform operations on input information based on one or more attributes specified by the attribute component 130. According to an embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. Additionally, or alternatively, output from the simulation component 120 may be input to one or more other workflows, as indicated by a workflow component 144. Further, dotted lines indicate possible feedback within the management components 110. For example, feedback may occur between the analysis/visualization component 142 and either one of the processing components 116 and 140.

According to an example embodiment, the management components 110 may include features of a commercially available simulation framework such as the PETREL™ seismic to simulation software framework (Schlumberger Limited, Houston, Tex.). The PETREL™ framework provides components that allow for optimization of exploration and development operations. The PETREL™ framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

According to an example embodiment, the management components 110 may include features for geology and geological modeling to generate high-resolution geological models of reservoir structure and stratigraphy (e.g., classification and estimation, facies modeling, well correlation, surface imaging, structural and fault analysis, well path design, data analysis, fracture modeling, workflow editing, uncertainty and optimization modeling, petrophysical modeling, etc.). As to reservoir engineering, for a generated model, one or more features may allow for simulation workflow to perform streamline simulation, reduce uncertainty and assist in future well planning (e.g., uncertainty analysis and optimization workflow, well path design, advanced gridding and upscaling, history match analysis, etc.). The management components 110 may include features for drilling workflows including well path design, drilling visualization, and real-time model updates (e.g., via real-time data links).

According to an example embodiment, various aspects of the management components 110 may be add-ons or plug-ins that operate according to specifications of a framework environment. For example, a commercially available framework environment marketed as the OCEAN™ framework environment (Schlumberger Limited, Houston, Tex.) allows for seamless integration of add-ons (or plug-ins) into a PETREL™ framework workflow. The OCEAN™ framework environment leverages .NET™ tools (Microsoft Corporation, Redmond, Wash.) and offers stable, user-friendly interfaces for efficient development. According to an embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may be the commercially available OCEAN™ framework where the model simulation layer 180 is the commercially available PETREL™ model-centric software package that hosts OCEAN™ framework applications. According to an embodiment, the PETREL™ software may be considered a data-driven application.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for all application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

As an example, the PETREL™ framework may integrate multidisciplinary workflows surrounding ECLIPSE™ simulation modules, for example, to provide transparent data flows and an intuitive graphical user interface. Modules may include the ECLIPSE™ blackoil simulation module for three-phase, 3D reservoir simulation with well controls, field operations planning, and enhanced oil recovery (EOR) schemes; the ECLIPSE™ compositional simulation module for reservoir fluid phase behavior and compositional changes, when modeling multicomponent hydrocarbon flow; the ECLIPSE™ FrontSim™ simulation module for modeling multiphase fluid flow along streamlines, supporting both geological model screening and pattern flood management; the ECLIPSE™ thermal simulation module for support of a wide range of thermal recovery processes, including steam-assisted gravity drainage, cyclic steam operations, toe-to-heel air injection, and cold heavy oil production with sand; and one or more other modules such as a coalbed methane module, an advanced well module, etc. As described herein, an ESP controller may optionally provide for access to one or more frameworks (e.g., PETREL™, ECLIPSE™, PIPESIM™, etc.), for example, for purposes of data exchange, control, etc.

In the example of FIG. 1, as indicated, the management components 110 may receive information (see, e.g., the feedback 160) from the geologic environment 150. As an example, the downhole equipment 154 may include an ESP outfitted with one or more sensors that transmit data as, for example, the other information 114. In turn, one or more of the management components 110 may process the data to provide instructions to the geologic environment 150, for example, to adjust one or more operational parameters that may impact operation of the downhole equipment 154 (e.g., an ESP). As shown in FIG. 1, transmission of information may occur via one or more networks. Further, information from other geologic environments, other downhole equipment, etc., may be transmitted to one or more of the management components 110.

Figure 2:
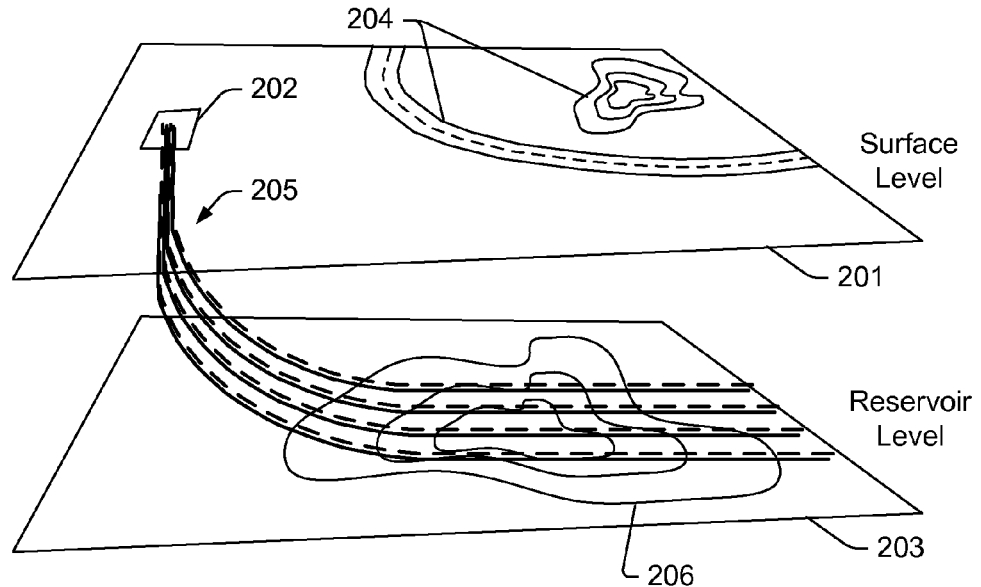
FIG. 2 illustrates an example of geologic environment that includes steam injection and artificial lift.
Figure 2:
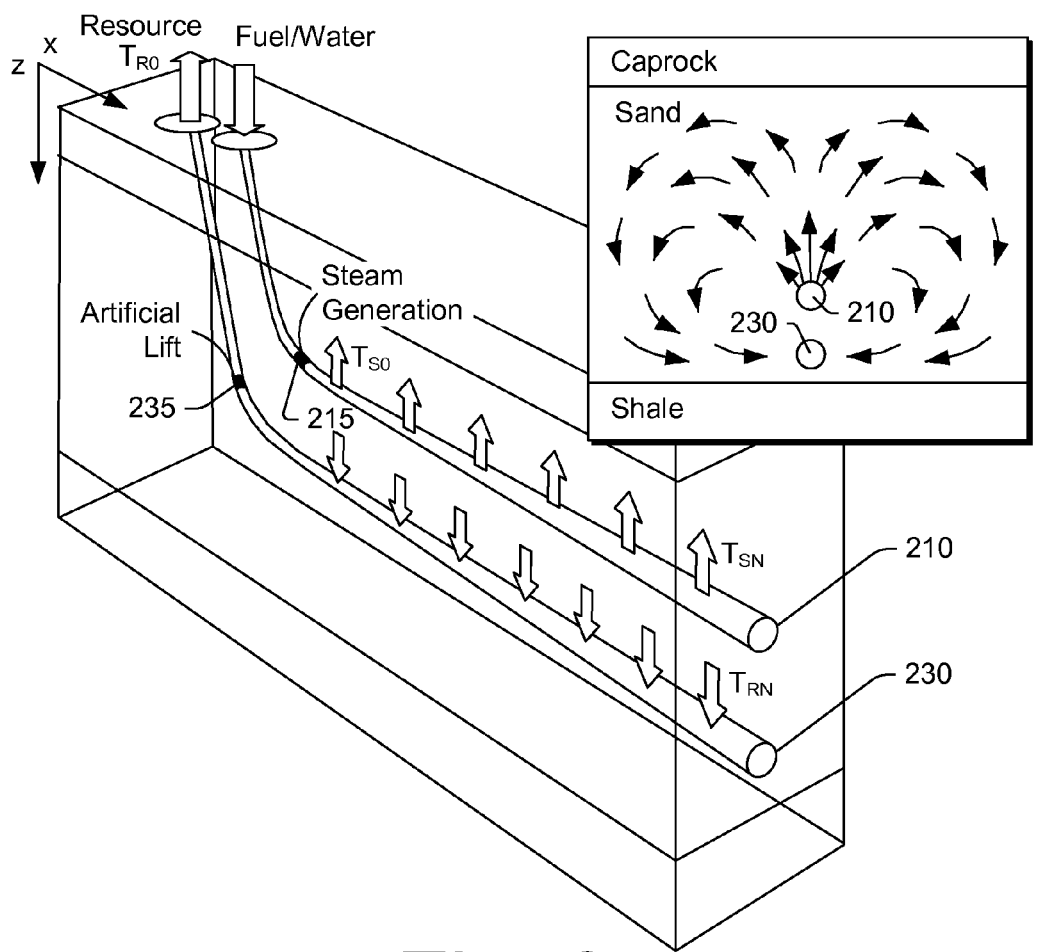

FIG. 2 shows an example of a geologic environment 200 (e.g., a basin) being defined, for example, as including a surface level 201 (e.g., upper surface or layer) and a reservoir level 203 (e.g., lower surface or layer). As shown in FIG. 2, a structure 202 may be placed (e.g., built) on the surface level 201 for drilling or operating subsurface equipment 205 for exploring, injecting, extracting, etc.

In the example of FIG. 2, the equipment 205 may be steam assisted gravity drainage (SAGD) equipment for injecting steam and extracting resources from a reservoir 206. For example, a SAGD operation can include a steam-injection well 210 and a resource production well 230. In the example of FIG. 2, a downhole steam generator 215 generates steam in the injection well 210, for example, based on supplies of water and fuel from surface conduits, and artificial lift equipment 235 (e.g., ESP, etc.) may be implemented to facilitate resource production. While a downhole steam generator is shown, steam may be alternatively, or additionally, generated at the surface level. As illustrated in a cross-sectional view, the steam rises in the subterranean portion. As the steam rises, it transfers heat to a desirable resource such as heavy oil. As the resource is heated, its viscosity decreases, allowing it to flow more readily to the resource production well 230.

As illustrated in the example of FIG. 2, SAGD is a technique that involves subterranean delivery of steam to enhance flow of heavy oil, bitumen, etc. SAGD can be applied for Enhanced Oil Recovery (EOR), which is also known as tertiary recovery because it changes properties of oil in situ.

With respect to extraction, SAGD may result in condensed steam from an upper well may accompany oil to a lower well, which can impact artificial lift (e.g., ESP) operations and increase demands on separation processing where it is desirable to separate one or more components from the oil and water mixture.

As to the downhole steam generator 215, it may be fed by three separate streams of natural gas, air and water where a gas-air mixture is combined first to create a flame and then the water is injected downstream to create steam. In such an example, the water can also serve to cool a burner wall or walls (e.g., by flowing in a passageway or passageways within a wall).

The example of FIG. 2 demonstrates how operation of a steam generator or, more generally, steam injection, may impact operation of downhole equipment such as an ESP. Referring to the example of FIG. 1, the management components 110 may receive information (see, e.g., the feedback 160) from the geologic environment 150; similarly, the management components 110 may apply to the geologic environment 200 of FIG. 2, for example, where the equipment 215, the equipment 235 or both may transmit data as, for example, the other information 114. In turn, one or more of the management components 110 may process the data to provide instructions to the environment 200, for example, to adjust one or more operational parameters that may impact operation of the equipment 215, the equipment 235 (e.g., an ESP), or other equipment. As shown in FIG. 1, transmission of information may occur via one or more networks. Further, information from other geologic environments, other downhole equipment, etc., may be transmitted to one or more of the management components 110.

Figure 3:
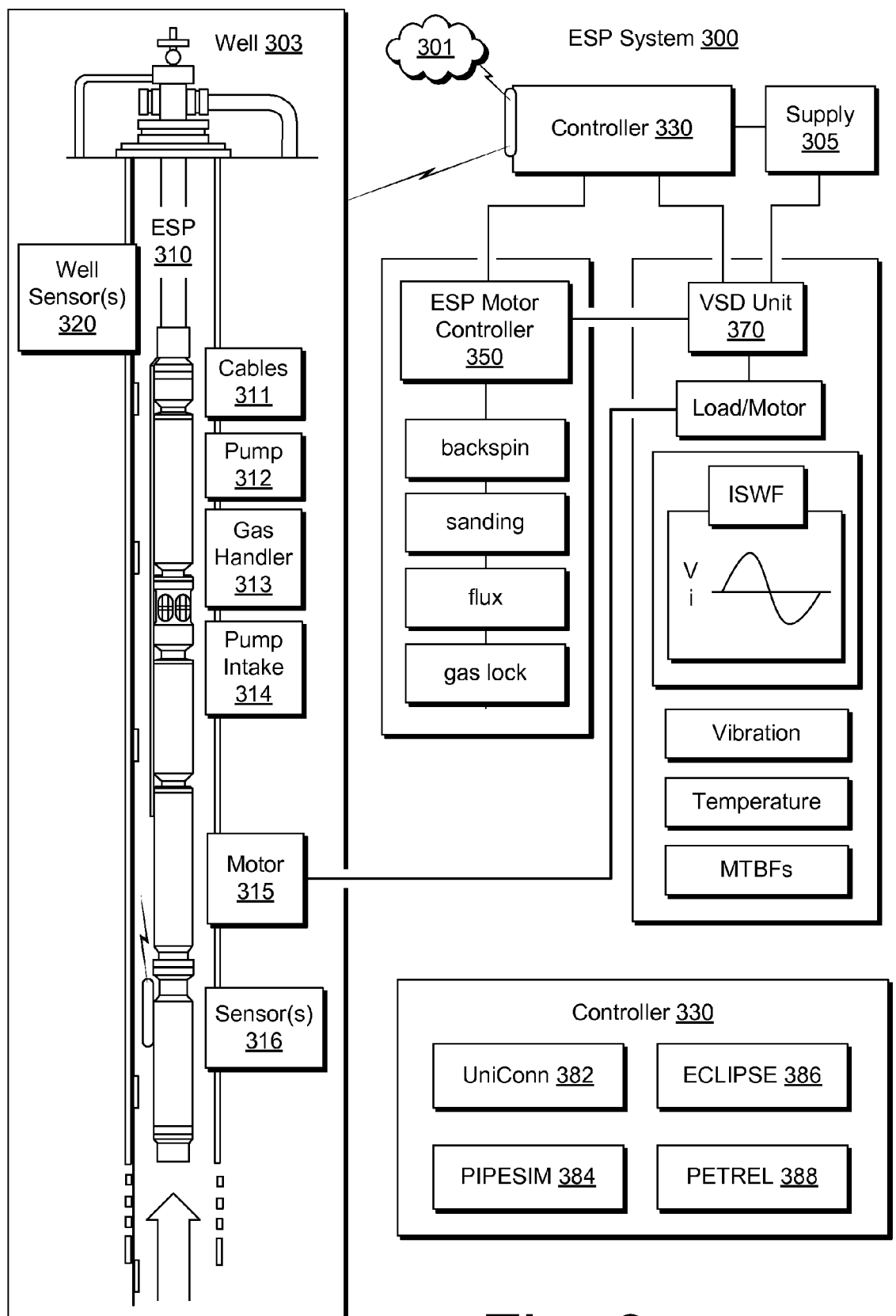
FIG. 3 illustrates an example of an electric submersible pump system.

FIG. 3 shows an example of an ESP system 300 as including a network 301, a well 303 disposed in a geologic environment, a power supply 305, an ESP 310, a controller 330, a motor controller 350 and a VSD unit 370. The power supply 305 may receive power from a power grid, an onsite generator (e.g., natural gas driven turbine), or other source. The power supply 305 may supply a voltage, for example, of about 4.16 kV.

The well 303 includes a wellhead that can include a choke (e.g., a choke valve). For example, the well 303 can include a choke valve to control various operations such as to reduce pressure of a fluid from high pressure in a closed wellbore to atmospheric pressure. A wellhead may include one or more sensors such as a temperature sensor, a pressure sensor, a solids sensor, etc.

The ESP 310 includes one or more cables 311, a pump 312, gas handling features 313, a pump intake 314, a motor 315 and one or more sensors 316 (e.g., temperature, pressure, current leakage, vibration, etc.). The well 303 may include one or more well sensors 320, for example, such as the commercially available OpticLine™ sensors or WellWatcher BriteBlue™ sensors marketed by Schlumberger Limited (Houston, Tex.), which are fiber-optic based and can provide for real time sensing of temperature, for example, in SAGD or other operations. As shown in the example of FIG. 2, a well can include a relatively horizontal portion. Such a portion may collect heated heavy oil responsive to steam injection. Measurements of temperature along the length of the well can provide for feedback, for example, to understand conditions downhole of an ESP. Well sensors may extend thousands of feet into a well (e.g., 4,000 feet or more) and beyond a position of an ESP.

The controller 330 can include one or more interfaces, for example, for receipt, transmission or receipt and transmission of information with the motor controller 350, a VSD unit 370, the power supply 305 (e.g., a gas fueled turbine generator, a power company, etc.), the network 301, equipment in the well 303, equipment in another well, etc.

As shown in FIG. 3, the controller 330 can include or provide access to one or more modules or frameworks. Further, the controller 330 may include features of an ESP motor controller and optionally supplant the ESP motor controller 350. For example, the controller 330 may include the UniConn™ motor controller 382 marketed by Schlumberger Limited (Houston, Tex.). In the example of FIG. 3, the controller 330 may access one or more of the PIPESIM™ framework 384, the ECLIPSE™ framework 386 and the PETREL™ framework 388.

In the example of FIG. 3, the motor controller 350 may be a commercially available motor controller such as the UniConn™ motor controller. The UniConn™ motor controller can connect to a SCADA system, the espWatcher™ surveillance system, etc. The UniConn™ motor controller can perform some control and data acquisition tasks for ESPs, surface pumps or other monitored wells. The UniConn™ motor controller can interface with the Phoenix™ monitoring system, for example, to access pressure, temperature and vibration data and various protection parameters as well as to provide direct current power to downhole sensors. The UniConn™ motor controller can interface with fixed speed drive (FSD) controllers or a VSD unit, for example, such as the VSD unit 370.

For FSD controllers, the UniConn™ motor controller may monitor ESP system 3-phase currents, 3-phase surface voltage, supply voltage and frequency, ESP spinning frequency and leg ground, power factor and motor load.

For VSD units, the UniConn™ motor controller may monitor VSD output current, ESP running current, VSD output voltage, supply voltage, VSD input and VSD output power, VSD output frequency, drive loading, motor load, 3-phase ESP running current, 3-phase VSD input or output voltage, ESP spinning frequency, and leg-ground.

The UniConn™ motor controller can include control functionality for VSD units such as target speed, minimum and maximum speed and base speed (voltage divided by frequency); three jump frequencies and bandwidths; volts per hertz pattern and start-up boost; ability to start an ESP while the motor is spinning; acceleration and deceleration rates, including start to minimum speed and minimum to target speed to maintain constant pressure/load (e.g., from 0.01 Hz/10,000 s to 1 Hz/s); stop mode with PWM carrier frequency; base speed voltage selection; rocking start frequency, cycle and pattern control; stall protection with automatic speed reduction; changing motor rotation direction without stopping; speed force; speed follower mode; frequency control to maintain constant speed, pressure or load; current unbalance; voltage unbalance; overvoltage and undervoltage; ESP backspin; and leg-ground.

In the example of FIG. 3, the ESP motor controller 350 includes various modules to handle, for example, backspin of an ESP, sanding of an ESP, flux of an ESP and gas lock of an ESP. As mentioned, the motor controller 350 may include any of a variety of features, additionally, alternatively, etc.

In the example of FIG. 3, the VSD unit 370 may be a low voltage drive (VSD) unit, a medium voltage drive (MVD) unit or other type of unit. For a LVD, a VSD unit can include a step-up transformer, control circuitry and a step-up transformer while, for a MVD, a VSD unit can include an integrated transformer and control circuitry. As an example, the VSD unit 370 may receive power with a voltage of about 4.16 kV and control a motor as a load with a voltage from about 0 V to about 4.16 kV.

The VSD unit 370 may include commercially available control circuitry such as the SpeedStar™ MVD control circuitry marketed by Schlumberger Limited (Houston, Tex.). The SpeedStar™ MVD control circuitry includes a visible fused disconnect switch, precharge circuitry, and sine wave output filter (e.g., integral sine wave filter, ISWF) tailored for control and protection of high-horsepower ESPs. The SpeedStar™ MVD control circuitry can include a plug-and-play sine wave output filter, a multilevel PWM inverter output, a 0.95 power factor, programmable load reduction (e.g., soft-stall function), speed control circuitry to maintain constant load or pressure, rocking start (e.g., for stuck pumps resulting from scale, sand, etc.), a utility power receptacle, an acquisition system for the Phoenix™ monitoring system, a site communication box to support surveillance and control service, a speed control potentiometer. The SpeedStar™ MVD control circuitry can optionally interface with the UniConn™ motor controller, which may provide some of the foregoing functionality.

In the example of FIG. 3, the VSD unit 370 is shown along with a plot of a sine wave (e.g., achieved via a sine wave filter that includes a capacitor and a reactor), responsiveness to vibration, responsiveness to temperature and as being managed to reduce mean time between failures (MTBFs). The VSD unit 370 may be rated with an ESP to provide for about 40,000 hours (5 years) of operation at a temperature of about 50 C with about a 100% load. The VSD unit 370 may include surge and lightening protection (e.g., one protection circuit per phase). With respect to operational cost, as an example, for a 373 kW load, an increase in efficiency of about 0.5% may translate into about $1,000 per year in power savings (e.g., depending on cost of power). As to leg-ground monitoring, water intrusion monitoring, etc., such types of monitoring may indicate whether corrosion is or has occurred. Further monitoring of power quality from a supply, to a motor, at a motor, may occur by one or more circuits or features of a controller.

As an example, a VSD unit may be provided that operates at a standard input voltage or voltages (e.g., that range from about 380 V to about 4.16 kV or more). For a SpeedStar 2000 Plus™ VSD unit (Schlumberger Limited, Houston, Tex.) or SineWave Drive™ (SWD) unit (Schlumberger Limited, Houston, Tex.) rated to operate at 480 V, if a VSD unit is rated for 1000 kVA, this means that the unit will output 1000 kVA at 480 V. Such a relationship may be applicable for various VSD units, for example, as a VSD unit may have an upper and lower limit for the input voltage that it can operate.

As an example, a VSD unit may change its base speed (commonly known as the output Volts/Hz ratio) when running an ESP motor. The base speed of a VSD unit is described as the point at which the VSD unit reaches it maximum output voltage at a specified frequency. As an example, a motor can be optimized by adjusting the voltage delivered to a motor according to load.

Overall system efficiency can affect power supply from the utility or generator. As described herein, monitoring of ITHD, VTHD, PF and overall efficiency may occur (e.g., surface measurements). Such surface measurements may be analyzed in separately or optionally in conjunction with a pump curve. VSD unit related surface readings (e.g., at an input to a VSD unit) can optionally be input to an economics model. For example, the higher the PF and therefore efficiency (e.g., by running an ESP at a higher frequency and at close to 100% load), the less harmonics current (lower ITHD) sensed by the power supply. In such an example, well operations may experience less loses and thereby lower energy costs for the same load.

While the example of FIG. 3 shows an ESP with centrifugal pump stages, another type of ESP may be controlled. For example, an ESP may include a hydraulic diaphragm electric submersible pump (HDESP), which is a positive-displacement, double-acting diaphragm pump with a downhole motor. HDESPs find use in low-liquid-rate coalbed methane and other oil and gas shallow wells that require artificial lift to remove water from the wellbore.

Figure 4:
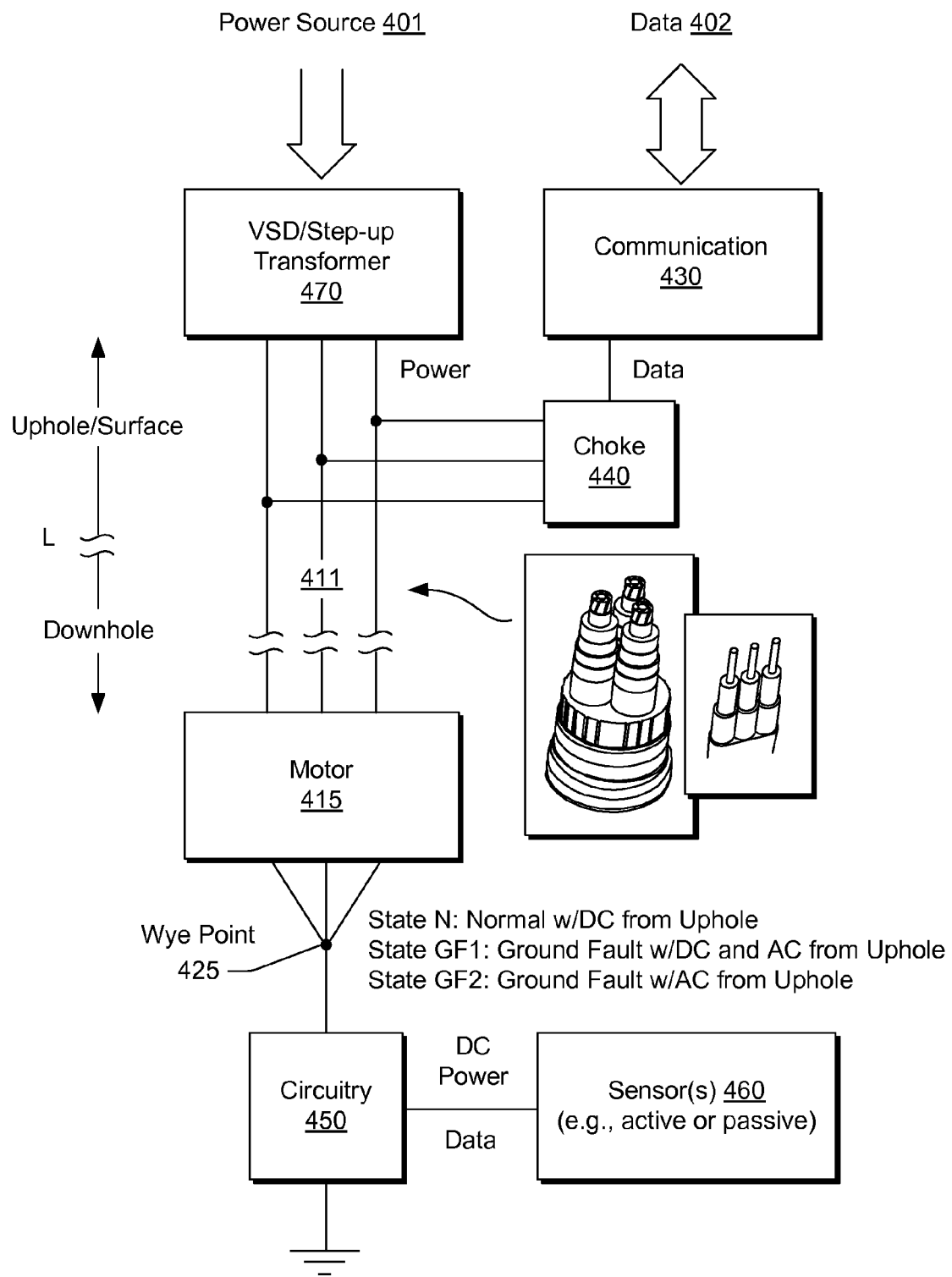
FIG. 4 illustrates an example of a system that provides for delivery of power and transmission of data.

FIG. 4 shows a block diagram of an example of a system 400 that includes a power source 401 as well as data 402. The power source 401 provides power to a VSD/step-up transformer block 470 while the data 402 may be provided to a communication block 430. The data 402 may include instructions, for example, to instruct circuitry of the circuitry block 450, one or more sensors of the sensor block 460, etc. The data 402 may be or include data communicated, for example, from the circuitry block 450, the sensor block 460, etc. In the example of FIG. 4, a choke block 440 can provide for transmission of data signals via a power cable 411 (e.g., including motor lead extensions "MLEs"). A power cable may be provided in a format such as a round format or a flat format with multiple conductors. MLEs may be spliced onto a power cable to allow each of the conductors to physically connect to an appropriate corresponding connector of an electric motor.

As shown, the power cable 411 connects to a motor block 415, which may be a motor (or motors) of an ESP and be controllable via the VSD/step-up transformer block 470. In the example of FIG. 4, the conductors of the power cable 411 electrically connect at a wye point 425. The circuitry block 450 may derive power via the wye point 425 and may optionally transmit, receive or transmit and receive data via the wye point 425. As shown, the circuitry block 450 may be grounded.

The system 400 can operate in a normal state (State N) and in at least one ground fault state (e.g., State GF1 or State GF2). One or more ground faults may occur for any of a variety of reasons. For example, wear of the power cable 411 may cause a ground fault for one or more of its conductors. As another example, wear of one of the MLEs of the power cable 411 (e.g., mechanical, chemical, thermal, etc.) may cause a ground fault.

The system 400 may include provisions to continue operation of a motor of the motor block 415 when a ground fault occurs. However, when a ground fault does occur, power at the wye point 425 may be altered. In the example of FIG. 4, the circuitry block 450 can operate to supply power to the sensor block 460 in State N (e.g., normal, DC) and at least one of State GF1 (e.g., ground fault, mixed DC/AC) and State GF2 (e.g., ground fault, AC). Further, the circuitry block 450 may provide for telemetry in State N and at least one of State GF1 and State GF2. For example, a system can include circuitry to determine one or more power signal characteristics at a wye point of an electric motor of an electric submersible pump; and circuitry responsive to the determined one or more power signal characteristics to automatically provide DC power from the wye point or to automatically derive DC from AC power from the wye point. In such a system, the circuitry responsive to detection of a ground fault may also include circuitry to automatically provide DC power from the wye point and to automatically derive DC from AC power from the wye point. As an example, a system may be a state machine capable of automatically entering a state based on one or more power signal characteristics of a power signal (or signals) available at a wye point of an electric motor. In such an example, states may include a DC pass through state (see, e.g., State N), a DC pass through and AC to DC conversion state (see, e.g., State GF1), and an AC to DC conversion state (see, e.g., State GF2).

As an example, the circuitry 450 may provide for assessing quality of power for supply of DC power to one or more pieces of equipment. Such circuitry may assess quality, for example, based on one or more characteristics of power available at the wye point 425 of the motor 415, at the motor 415, at the power cable 411, etc. As an example, such circuitry may change state, issue a signal, alter a switch, etc., for example, where supply of DC power is deemed unsuitable for a particular purpose or purposes.

As an example, power cables and MLEs that can resist damaging forces, whether mechanical, electrical or chemical, may help ensure proper operation of a motor, circuitry, sensors, etc.; noting that a faulty power cable (or MLE) can potentially damage a motor, circuitry, sensors, etc. Further, as mentioned, an ESP may be located several kilometers into a wellbore. Accordingly, time and cost to replace a faulty ESP, power cable, MLE, etc., can be substantial (e.g., time to withdraw, downtime for fluid pumping, time to insert, etc.).

Commercially available power cables include the REDAMAX™ Hotline™ ESP power cables (e.g., as well as motor lead extensions "MLEs"), which are marketed by Schlumberger Limited (Houston, Tex.). As an example, a REDAMAX™ Hotline™ ESP power cable can include combinations of polyimide tape, lead, EPDM, and PEEK to provide insulation and a jacket. Lead walls can provide for compatibility with high gas/oil ratio (GOR) and highly corrosive conditions. Armor can mechanically protect the cable and may be galvanized steel, heavy galvanized steel, stainless steel, or Monel® alloy. The pothead is an electrical connector between a cable and an ESP motor that may be constructed with metal-to-metal seals. A pothead can provide a mechanical barrier to fluid entry in high-temperature applications.

As an example of a REDAMAX™ Hotline™ ESP power cable, a 5 kV round ELBE G5R can include solid conductor sizes of 1 AWG/1, 2 AWG/1 and 4 AWG/1. As another example, a 5 kV flat EHLTB G5F can include a solid conductor size of 4 AWG/1. Dimensions may be, for round configurations, about 1 to 2 inches in diameter and, for flat configurations, about half an inch by about 1 to 2 inches. Weights may range from about 1 lbm/ft to about 3 lbm/ft.

Figure 5:
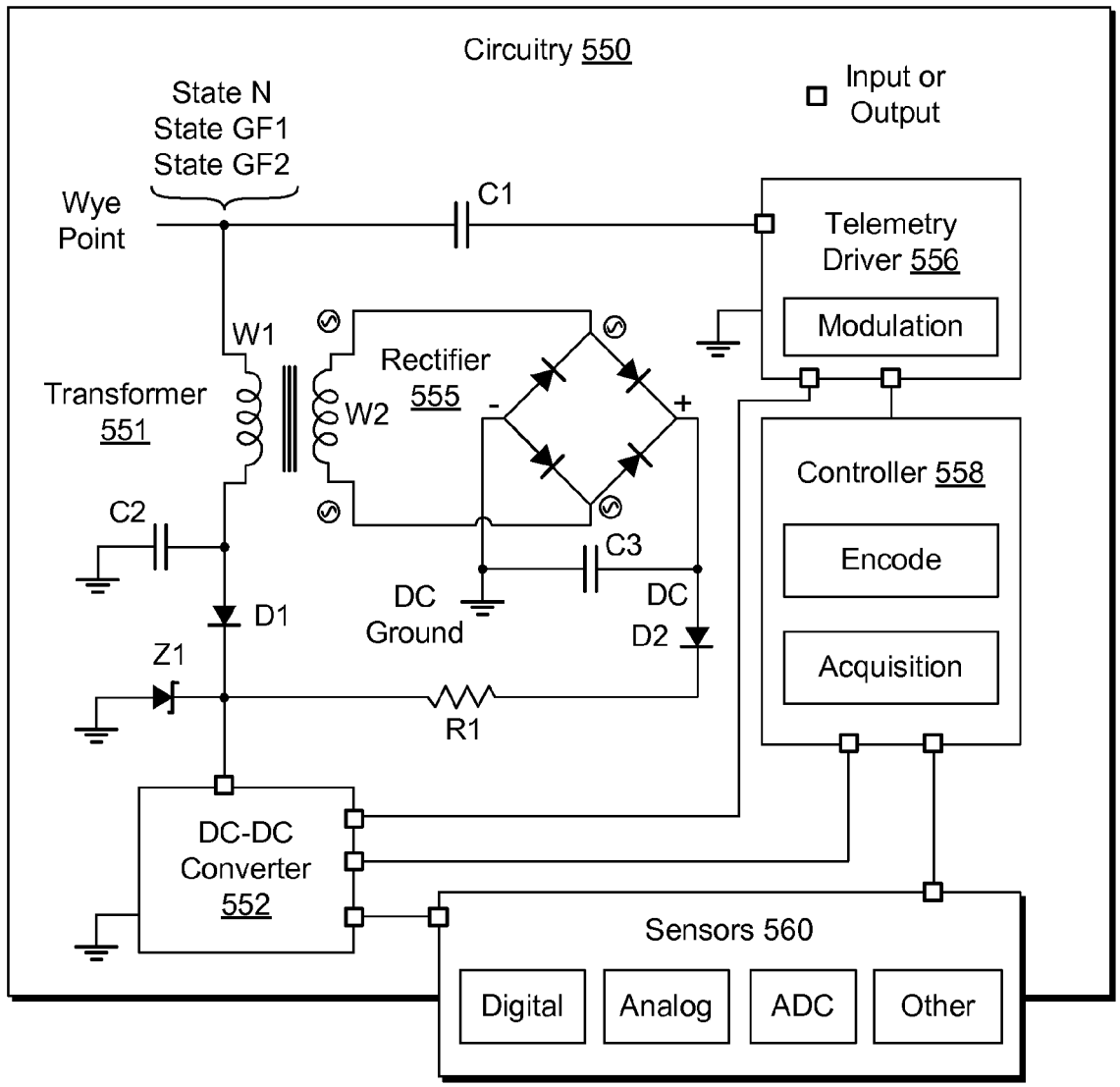
FIG. 5 illustrates an example of a system that can operate in a non-ground fault state and in at least one ground fault state.

FIG. 5 shows an example of circuitry 550 and one or more sensors 560, which may be suitable for use in the system 400 of FIG. 4 (see, e.g., circuitry block 450 and sensor block 460). The circuitry 550 includes an electrical connection to a wye point of a motor, a transformer 551, a DC-DC converter 552, a rectifier 555, a telemetry driver 556 and a controller 558. In the example of FIG. 5, the circuitry 550 may include various components such as diodes (D), Zener diodes (Z), capacitors (C), windings (W), resistors (R), etc.

As indicated, the circuitry 550 may operate in State N, State GF1 or State GF2, for example, with respect to the wye point. In the example of FIG. 5, for State N, a primary winding (W1) of the transformer 551 acts to reduce detrimental impact of normal wye point unbalance and allows a DC power signal to proceed to the DC-DC converter 552. The DC-DC converter 552 can convert the DC power signal and provide one or more converted DC power signals to the telemetry driver 556, the controller 558 and the one or more sensors 560.

In the example of FIG. 5, for State GF1 or State GF2, where abnormal unbalance exists at the wye point (e.g., due to a ground fault), the primary winding (W1) of the transformer 551 acts to reduce detrimental impact of the abnormal wye point unbalance and further cooperates with the secondary winding (W2) to allow the rectifier 555 to derive a suitable DC power signal. As shown, a positive DC tap point of the rectifier 555 is electrically connected to the DC-DC converter 552. In such a manner, when a ground fault exists, unbalance voltage of alternating current at the wye point can be stepped down via the transformer 551 and then rectified via the rectifier 555 to supply a suitable DC power signal to the DC-DC converter 552, which may supply one or more DC power signals to the telemetry driver 556, the controller 558 and the one or more sensors 560. As an alternative, the rectifier 555 (e.g., optionally with associated circuitry) may provide a DC power signal or signals suitable for powering the telemetry driver 556, the controller 558 or the one or more sensors 560 (e.g., without reliance on the DC-DC converter 552).

As to telemetry, the telemetry driver 556 includes an electrical connection to the wye point. Sensed information (e.g., data) from the one or more sensors 560 may be acquired by the controller 558 and encoded using encoding circuitry. The encoded information may be provided to the telemetry driver 556 where modulation circuitry provides for signal modulation to carry the encoded information for transmission via the wye point of an electric motor. As an example, the telemetry driver 556 may alternatively or additionally receive information from the wye point. Where such information is modulated, encoded, or modulated and encoded, the circuitry 550 may provide for demodulation, decoding or demodulation and decoding.

As to the telemetry driver 556, as an example, it may transmit information to a wye point of an electric motor at one or more frequencies (e.g., approximately 10 kHz to approximately 15 kHz) higher than a power supply frequency of power supplied to drive the electric motor (e.g., less than approximately 100 Hz). As an example, transmitted data signals may be modulated using multichannel frequency shift keying (FSK), orthogonal frequency division multiplexing (OFDM), or phase shift keying (PSK).

Figure 6:
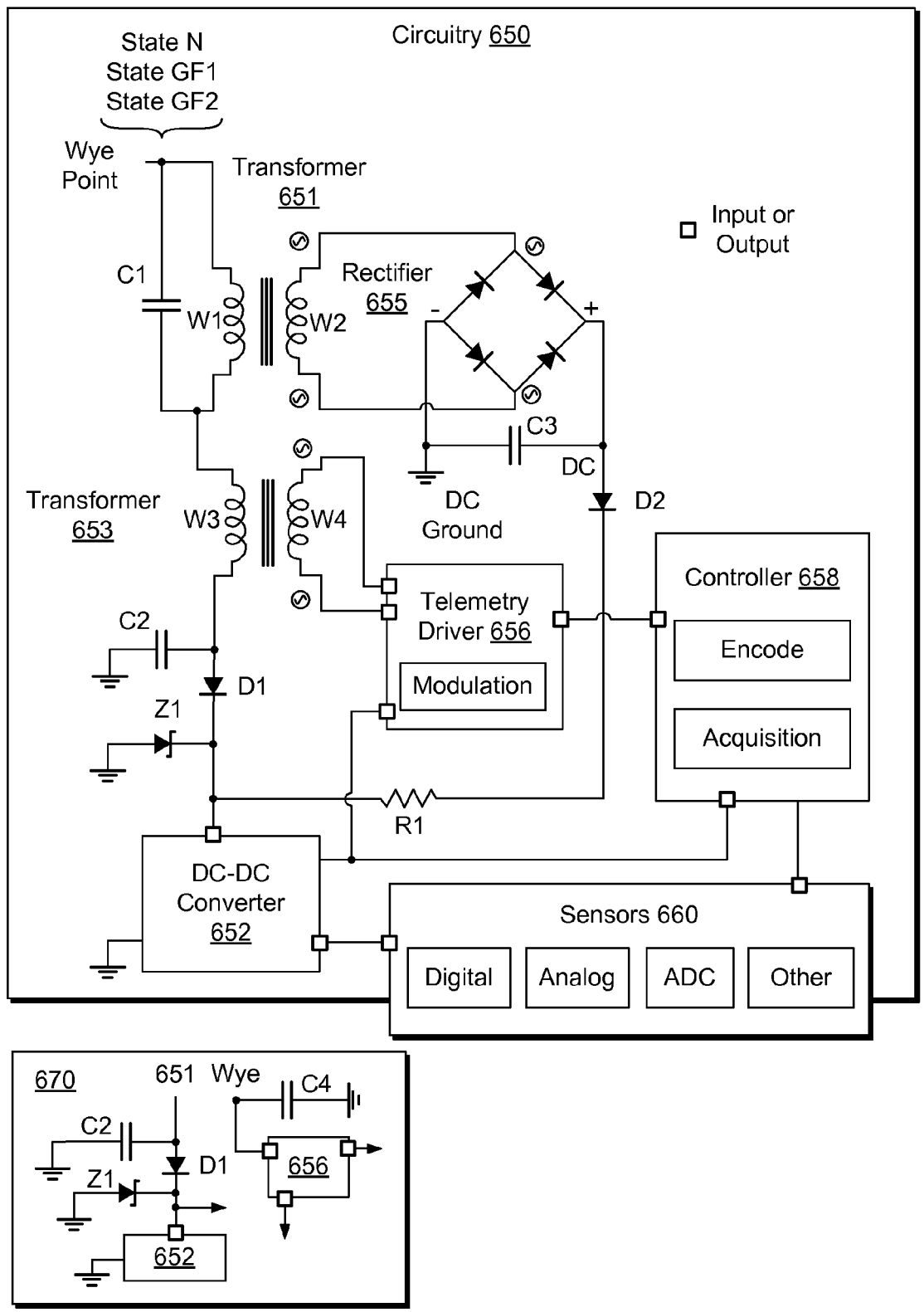
FIG. 6 illustrates an example of a system that can operate in a non-ground fault state and in at least one ground fault state.

FIG. 6 shows an example of circuitry 650 and one or more sensors 660, which may be suitable for use in the system 400 of FIG. 4 (see, e.g., circuitry block 450 and sensor block 460). In the example of FIG. 6, the circuitry 650 includes an electrical connection to a wye point of a motor, a transformer 651, a transformer 653, a DC-DC converter 552, a rectifier 655, a telemetry driver 656 and a controller 658. In the example of FIG. 6, the circuitry 650 may include various components such as diodes (D), Zener diodes (Z), capacitors (C), windings (W), resistors (R), etc. FIG. 6 also shows an alternative arrangement 670, for example, without the transformer 653 and with coupling of the telemetry driver 656 directly to the wye point of the motor (e.g., with a capacitor C4).

As indicated, the circuitry 650 may operate in State N, State GF1 or State GF2, for example, with respect to the wye point. For State N, a primary winding (W1) of the transformer 651 and a data transmission winding (W3) of the transformer 653 act to reduce detrimental impact of normal wye point unbalance and allows a DC power signal to proceed to the DC-DC converter 652. The DC-DC converter 652 can convert the DC power signal and provide one or more converted DC power signals to the telemetry driver 656, the controller 658 and the one or more sensors 660.

For State GF1 or State GF2, where abnormal unbalance exists at the wye point (e.g., due to a ground fault), the primary winding (W1) of the transformer 651 and the data transmission winding (W3) of the transformer 653 act to reduce detrimental impact of the abnormal wye point unbalance and the primary winding (W1) of the transformer 651 further cooperates with a secondary winding (W2) of the transformer 651 to allow the rectifier 655 to derive a suitable DC power signal. As shown, a positive DC tap point of the rectifier 655 is electrically connected to the DC-DC converter 652. In such a manner, when a ground fault exists, unbalance voltage of alternating current at the wye point can be stepped down via the transformer 651 and then rectified via the rectifier 655 to supply a suitable DC power signal to the DC-DC converter 652, which may supply one or more DC power signals to the telemetry driver 656, the controller 658 and the one or more sensors 660. As an alternative, the rectifier 655 (e.g., optionally with associated circuitry) may provide a DC power signal or signals suitable for powering the telemetry driver 656, the controller 658 or the one or more sensors 660 (e.g., without reliance on the DC-DC converter 652).

As to telemetry, the telemetry driver 656 includes an electrical connection to another data transmission winding (W4) of the transformer 653. In the example of FIG. 6, the windings (W3, W4) of the transformer 653 provide for uni-directional or bi-directional transmission of data, noting that the winding W3 is electrically connected to the wye point. Sensed information (e.g., data) from the one or more sensors 660 may be acquired by the controller 658 and encoded using encoding circuitry. The encoded information may be provided to the telemetry driver 656 where modulation circuitry provides for signal modulation to carry the encoded information for transmission to the transformer 653 and to the wye point of an electric motor. As an example, the telemetry driver 656 may alternatively or additionally receive information from the wye point via the transformer 653. Where such information is modulated, encoded, or modulated and encoded, the circuitry 650 may provide for demodulation, decoding or demodulation and decoding.

As to the telemetry driver 656, as an example, it may transmit information to the transformer 653 and subsequently to a wye point of an electric motor at one or more frequencies (e.g., approximately 10 kHz to approximately 15 kHz) higher than a power supply frequency of power supplied to drive the electric motor (e.g., less than approximately 100 Hz). As an example, transmitted data signals may be modulated using multichannel frequency shift keying (FSK), orthogonal frequency division multiplexing (OFDM), or phase shift keying (PSK).

As an example, one or more sensors may each provide for converting a physical parameter to an electrical signal. Such an electrical signal may be converted to an electrical digital representation (e.g., via an analog to digital converter). As an example, an acquisition device (e.g., a microcontroller, a digital signal processor, etc.) may provide for sampling a digital output or outputs of one or more sensors, for example, according to a defined sequence. As an example, an encoder may provide for encoding sampled digital information in such a way that the information could be recovered even in the case of alteration during its transmission (e.g., to provide for robust information integrity). As an example, a telemetry driver may provide for modulation, for example, by varying a given parameter of an electrical carrier signal according to received encoded information from an encoder. As an example, a telemetry line driver may provide for amplifying a modulator output signal to a given voltage/current/power to be applied to a wye point (e.g., multiple phase wires), through a coupling circuit.

As mentioned, a coupling circuit may optionally include multiple windings. For example, a coupling circuit may be made up of passive components (e.g., first and secondary windings of downhole transformer and a capacitor). As an example, two transformers in series may be connected to a wye point of downhole motor where one of the transformers provides for data transmission.

As an example, a transformer may be directly, electrically connected to a wye point of a motor and have a high primary inductance to reduce conduction of unbalance voltage at the wye point, especially where a phase fault condition exists. At the same time, the transformer may allow for conduction of DC voltage to power one or more sensors, etc. For example, where DC voltage is provided via a power cable for the motor, it may be available at the wye point. In the foregoing example, the transformer can reduce alternating current while still providing DC voltage.

As an example, a circuit may include a capacitor parallel to a primary winding of a transformer to bypass high frequency telemetry signals that may be coupled via another transformer (e.g., or winding). As mentioned, a secondary winding of a transformer may be provided to extract power from an unbalanced wye point, for example, for purposes of providing power to one or more sensors, etc. (e.g., where a wye point provides a sufficient supply of AC power). As an example, AC power available at a wye point may be so-called secondary AC power injected into a power cable for a motor or may be AC power stemming from phase unbalance at the wye point. As mentioned, where a fault occurs, phase unbalance can cause a wye point to carry alternating current at a voltage level that is a large fraction of a motor supply voltage level.

Figure 7:
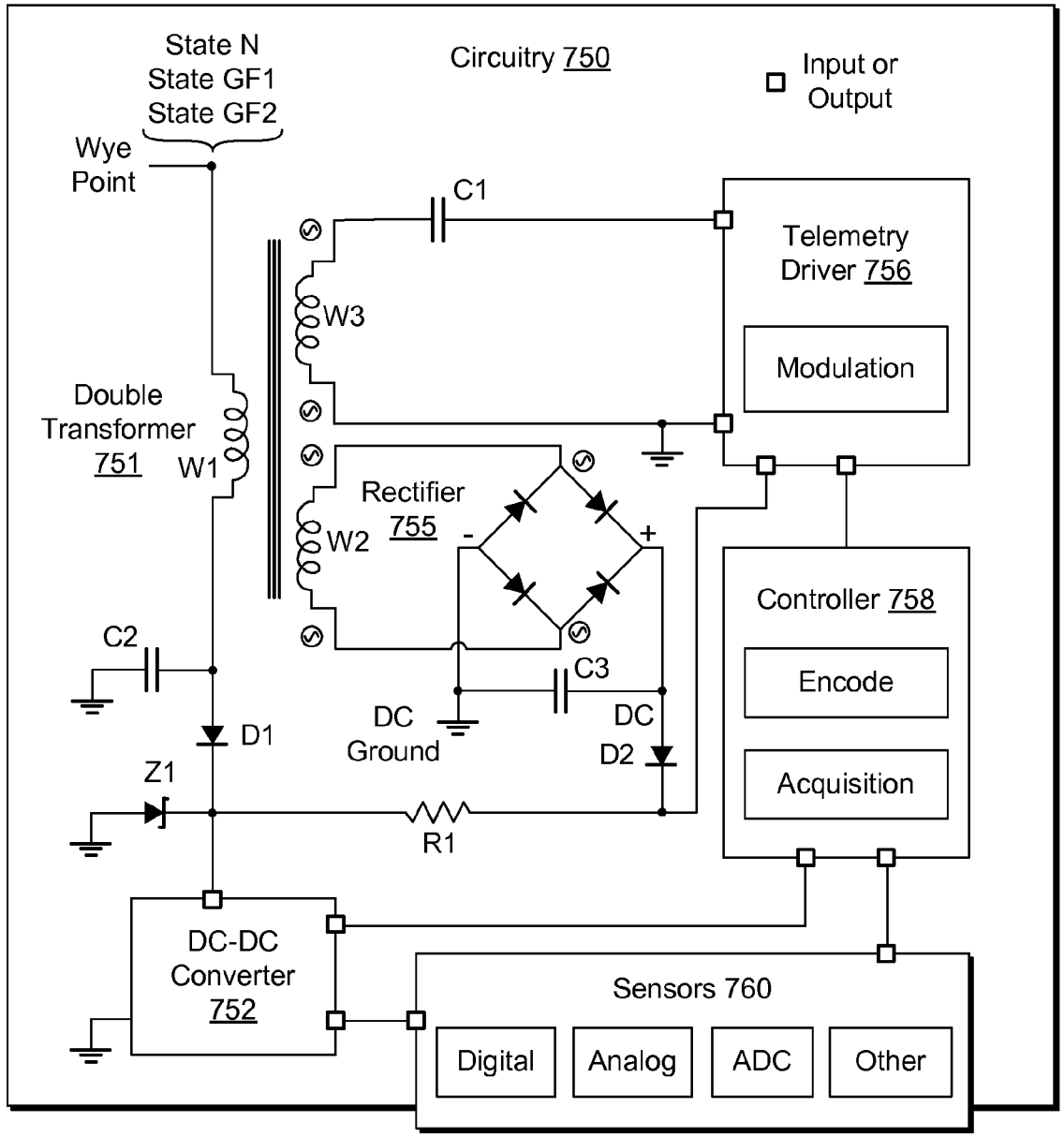
FIG. 7 illustrates an example of a system that can operate in a non-ground fault state and in at least one ground fault state.

FIG. 7 shows an example of circuitry 750 and one or more sensors 760, which may be suitable for use in the system 400 of FIG. 4 (see, e.g., circuitry block 450 and sensor block 460). The circuitry 750 includes an electrical connection to a wye point of a motor, a double transformer 751, a DC-DC converter 752, a rectifier 755, a telemetry driver 756 and a controller 758. In the example of FIG. 7, the circuitry 750 may include various components such as diodes (D), Zener diodes (Z), capacitors (C), windings (W), resistors (R), etc.

As indicated, the circuitry 750 may operate in State N, State GF1 or State GF2, for example, with respect to the wye point. For State N, a winding (W1) of the double transformer 751 acts to reduce detrimental impact of normal wye point unbalance and allows a DC power signal to proceed to the DC-DC converter 752. The DC-DC converter 752 can convert the DC power signal and provide one or more converted DC power signals to the telemetry driver 756, the controller 758 and the one or more sensors 760.

In the example of FIG. 7, for State GF1 or State GF2, where abnormal unbalance exists at the wye point (e.g., due to a ground fault), the winding (W1) of the double transformer 751 acts to reduce detrimental impact of the abnormal wye point unbalance and the winding (W1) of the transformer 751 further cooperates with a first secondary winding (W2) of the transformer 751 to allow the rectifier 755 to derive a suitable DC power signal. As shown, a positive DC tap point of the rectifier 755 is electrically connected to the DC-DC converter 752. In such a manner, when a ground fault exists, unbalance voltage of alternating current at the wye point can be stepped down via the windings (W1, W2) of the double transformer 751 and then rectified via the rectifier 755 to supply a suitable DC power signal to the DC-DC converter 752, which may supply one or more DC power signals to the telemetry driver 756, the controller 758 and the one or more sensors 760. As an alternative, the rectifier 755 (e.g., optionally with associated circuitry) may provide a DC power signal or signals suitable for powering the telemetry driver 756, the controller 758 or the one or more sensors 760 (e.g., without reliance on the DC-DC converter 752).

As to telemetry, the telemetry driver 756 includes an electrical connection to a second, secondary winding (W3) of the double transformer 751. In the example of FIG. 7, the windings (W1, W3) of the transformer 751 provide for uni-directional or bi-directional transmission of data, noting that the winding W1 is electrically connected to the wye point. Sensed information (e.g., data) from the one or more sensors 760 may be acquired by the controller 758 and encoded using encoding circuitry. The encoded information may be provided to the telemetry driver 756 where modulation circuitry provides for signal modulation to carry the encoded information for transmission to the transformer 751 (e.g., via winding W3) and to the wye point of an electric motor. As an example, the telemetry driver 756 may alternatively or additionally receive information from the wye point via the transformer 751 (e.g., via winding W1 to W3). Where such information is modulated, encoded, or modulated and encoded, the circuitry 750 may provide for demodulation, decoding or demodulation and decoding.

As to the telemetry driver 756, as an example, it may transmit information to the transformer 751 and subsequently to a wye point of an electric motor at one or more frequencies (e.g., approximately 10 kHz to approximately 15 kHz) higher than a power supply frequency of power supplied to drive the electric motor (e.g., less than approximately 100 Hz). As an example, transmitted data signals may be modulated using multichannel frequency shift keying (FSK), orthogonal frequency division multiplexing (OFDM), or phase shift keying (PSK).

Figure 8:
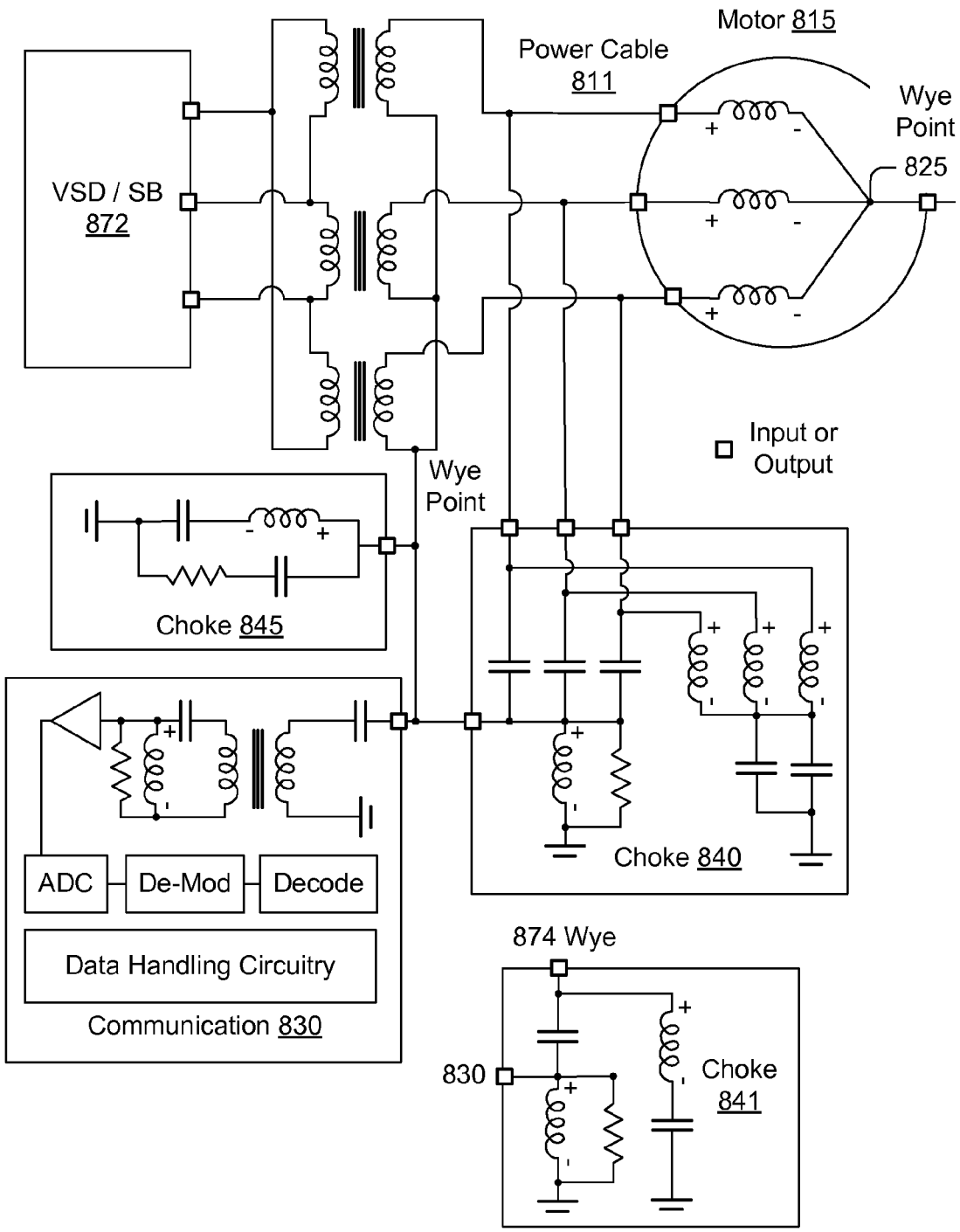
FIG. 8 illustrates an example of a system for data handling.

FIG. 8 shows an example of a system 800, which includes a power cable 811, a motor 815, a wye point 825, communication circuitry 830, a choke 840, a choke 845, a VSD unit and/or switchboard (SB) 872, and a 3-phase step-up transformer 874. FIG. 8 also shows an alternative arrangement 841, for example, with a single phase choke that can connect to a wye point of the transformer 874. Various components of the system 800 may be suitable for use in the system 400 of FIG. 4 (see also, e.g., the VSD unit 370 of the ESP system 300 of FIG. 3).

In the example of FIG. 8, data transmitted via the wye point 825 of the motor 815 may be carried by the power cable 811. To provide for redundancy, as an example, the choke 840 includes electrical connections to each of the conductors for the 3-phase power. Such redundancy can allow the choke 840 to receive modulated data signals provided to the wye point 825, for example, regardless of the state of each of the individual conductors that electrically connect to the wye point 825 (e.g., assuming at least one non-faulted conductor). In the example of FIG. 8, the wye point 825 may receive modulated data signals via circuitry such as, for example, the circuitry 550, the circuitry 650 or the circuitry 750 (see also, e.g., the circuitry 450 of FIG. 4).

As shown, the choke 840 includes an electrical connection to the communication circuitry 830. The communication circuitry 830 may receive modulated signals from the choke 840 and provide for conversion of such signals from analog to digital, provide for demodulation of such signals, provide for decoding of such signals or any combination thereof. The communication circuitry 830 may include data handling circuitry, for example, to further process data derived from signals transmitted via the choke 840. Such further processing may include formatting, analyzing, etc. As to formatting, the data handling circuitry may provide for formatting data according to one or more data transmission protocols (e.g., Internet, proprietary, etc.).

FIGS. 1 and 3 show some examples of data being transmitted for purposes of analysis, control, etc. The communication circuitry 830 may optionally be linked to equipment shown in the examples of FIGS. 1 and 3. For example, the communication circuitry 830 may be linked to the network 155 of FIG. 1 or linked to the network 301 of FIG. 3. As an example, an implementation of the system 800 of FIG. 8 may be in a geologic environment such as the geologic environment 200 of FIG. 2 (e.g., for SAGD or other EOR operation).

As an example, the communication circuitry 830 may include circuitry for digital signal processing (DSP). As an example, the communication circuitry 830 may provide for handling signals modulated using multichannel frequency shift keying (FSK), orthogonal frequency division multiplexing (OFDM), or phase shift keying (PSK). For example, the communication circuitry 830 may include circuitry for demodulating signals modulating using one or more of FSK, OFDM, PSK, etc.

As an example, the communication circuitry 830 or other circuitry may provide for sampling each phase line of a 3-phase power cable individually for purposes of extracting data. For example, the choke 840 may include a multiplexer controllable by the communication circuitry 830 to allow the communication circuitry 830 to select individual lines or optionally combinations of any two lines. In such a manner, if a ground fault does occur, the communication circuitry 830 may provide for selecting the best individual line or combination of lines in an effort to improve performance (e.g., demodulation, decoding, etc.).

As an example, downhole equipment may provide for transmission of a test signal, which may optionally be modulated, encoded, etc. In such an example, the communication circuitry 830 may control a multiplexer to test the quality of the test signal on each of line of a 3-phase power cable or combinations of lines of a 3-phase power cable (e.g., where the test signal or information carried therein is known). Based on the quality (e.g., per one or more quality control metrics), the communication circuitry 830 may control the multiplexer to receive signals via one or more lines of the 3-phase power cable. As an example, such a test may optionally provide information germane as to power quality, transmission quality, etc., for providing DC power to one or more pieces of downhole equipment (e.g., one or more sensors, etc.). As an example, such information may provide for determinations as to state (see, e.g., State N, State GF1 and State GF2 of FIGS. 4, 5, 6 and 7).

Figure 9:
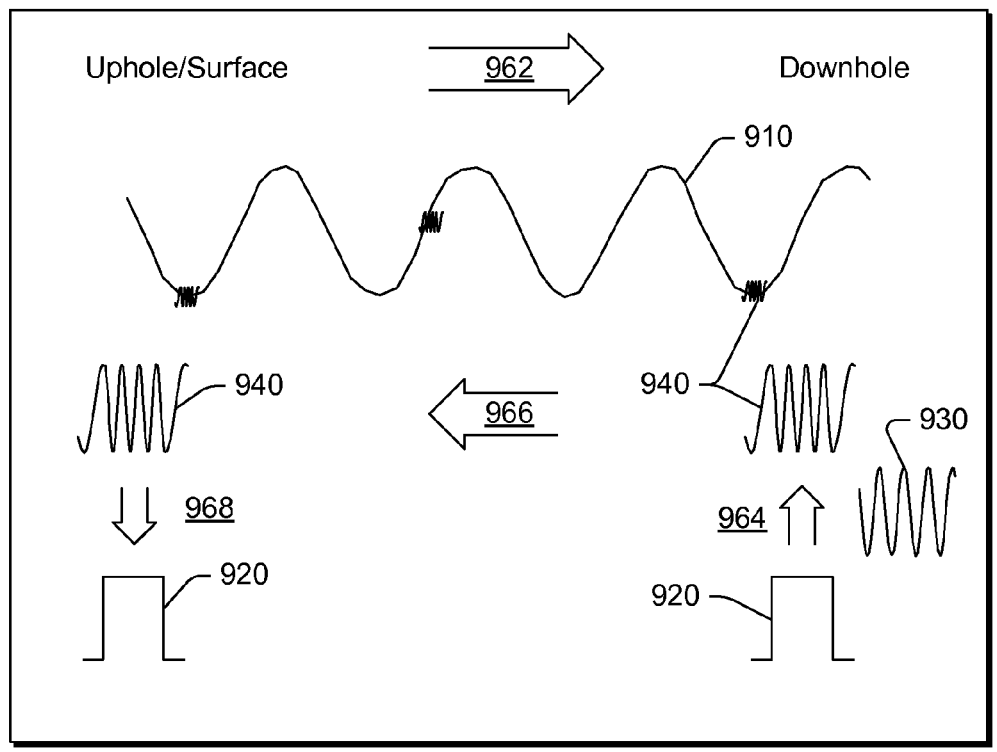
FIG. 9 illustrates examples of a systems for transmission of data uphole and downhole.
Figure 9:
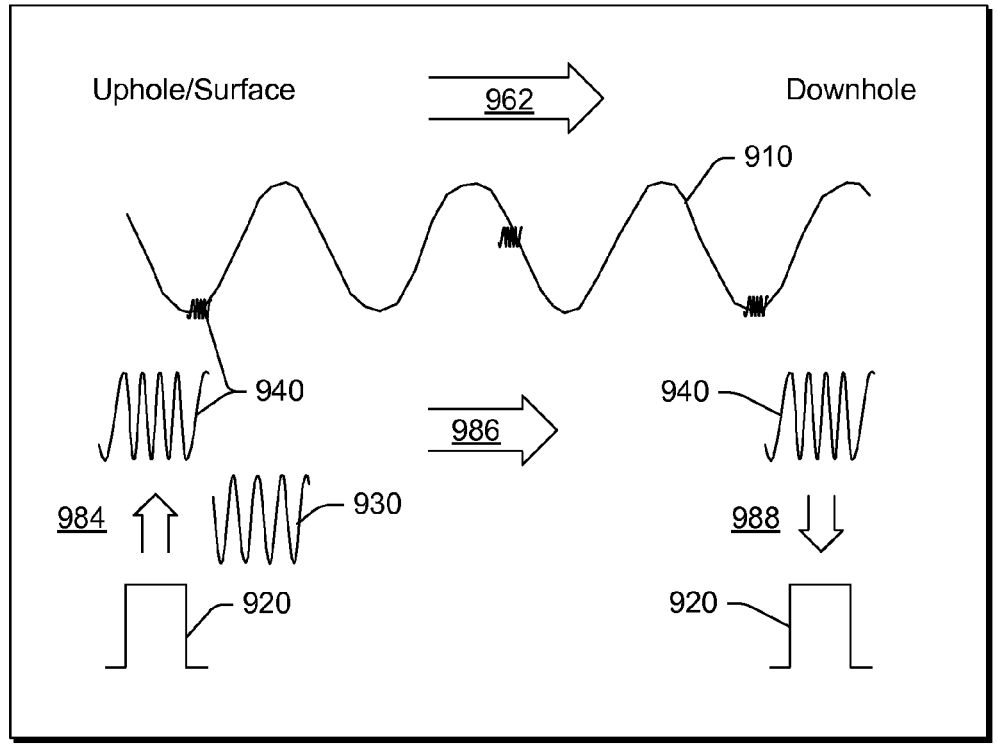

FIG. 9 shows an example of data transmission from downhole to uphole and an example of data transmission from uphole to downhole. In the example of data transmission from downhole to uphole, a power signal 910 is provided 962 via a power cable to power downhole equipment and a data signal 920 is combined 964 with a carrier signal 930 to provide a modulated signal 940. The modulated signal 940 is provided 966 to the power cable. At an uphole location, the modulated signal 940 is extracted from the power cable and demodulated 968 to provide the data signal 920. Depending on the condition of the power cable and equipment connected thereto, as well as environmental conditions, the quality of the data signal 920 at the uphole location may be somewhat degraded. A modulation technique may provide for maintaining integrity of the data signal 920 when transmission is subject to such conditions. Further, encoding may be implemented to further maintain data integrity when transmission is subject to such conditions.

In the example of data transmission from uphole to downhole, a power signal 910 is provided 962 via a power cable to power downhole equipment and a data signal 920 is combined 984 with a carrier signal 930 to provide a modulated signal 940. The modulated signal 940 is provided 986 to the power cable. At a downhole location, the modulated signal 940 is extracted from the power cable and demodulated 988 to provide the data signal 920. Depending on the condition of the power cable and equipment connected thereto, as well as environmental conditions, the quality of the data signal 920 at the downhole location may be somewhat degraded. A modulation technique may provide for maintaining integrity of the data signal 920 when transmission is subject to such conditions. Further, encoding may be implemented to further maintain data integrity when transmission is subject to such conditions.

In the examples of FIG. 9, downhole equipment and uphole equipment may include circuitry for modulation and demodulation as well as circuitry for encoding and decoding. Accordingly, depending on uphole and downhole circuitry, data transmission may occur uni-directionally or bi-directionally.

As an example, a system can include: a transformer and a rectifier to derive DC power from AC power at a wye point of an electric motor; a sensor that includes a sensor signal output to output a sensor signal; a telemetry driver that includes a DC power input to receive the derived DC power and an input to receive the sensor signal and an output to output a data signal representing the sensor signal (e.g., based at least in part on the derived DC power); and circuitry to deliver the data signal representing the sensor signal to the wye point of the electric motor.

As an example, a system may include a controller that includes acquisition circuitry to acquire a sensor signal from a sensor signal output, where input of a telemetry driver receives the sensor signal from the controller. In such an example, the controller may include encoding circuitry to encode the sensor signal, where the sensor signal received by the telemetry driver includes an encoded sensor signal.

As an example, a system can include a telemetry driver that includes carrier signal circuitry to generate a carrier signal, for example, where the carrier signal circuitry includes circuitry to generate a carrier signal that has a frequency greater than about 10 kHz (e.g., where an electric motor operates using 3-phase AC power that has a frequency less than about 100 Hz).

As an example, a system can include circuitry to deliver a data signal representing a sensor signal to a wye point of an electric motor via a transformer, a capacitor or via a transformer and a capacitor. Such a capacitor may be a capacitor disposed between the telemetry driver and the wye point.

As an example, a system can include a DC-DC converter electrically connected to a wye point of an electric motor. As an example, a DC-DC converter may be electrically connected to a rectifier (e.g., that rectifies AC to DC).

As an example, a system may include two or more transformers where, for example, circuitry to deliver a data signal representing a sensor signal to a wye point of an electric motor includes a winding of one of the transformer. As an example, a system may include a double transformer, for example, where circuitry to deliver a data signal representing a sensor signal to a wye point of an electric motor includes a winding of the double transformer.

As to a power cable, a system may include a power cable with three conductors, for example, electrically connected or connectable to an electric motor and, thereby, to a wye point of the electric motor. As an example, one or two of the conductors may include a current leakage path to ground. As an example, a power cable may include insulation damage that creates a current leakage path for one or two of the conductors.

As an example, a system can include: an electric submersible pump that includes an electric motor having a wye point; a power cable that includes three conductors, each of the three conductors electrically connected to the electric motor; a telemetry driver powered by DC power that includes at least one electrical connection to the power cable; a sensor; and a transformer that includes two opposing windings where one of the windings passes DC power from the wye point to power the telemetry driver and the other one of the windings steps down AC power from the wye point for conversion to DC power to power the telemetry driver. Such a system may also include a DC-DC converter to receive DC power passed by the one of the windings and to receive DC power converted from the stepped down AC power. As an example, a telemetry driver that includes at least one electrical connection to a power cable can include an electrical connection established by a transformer (e.g., winding to winding connection).

Figure 10:
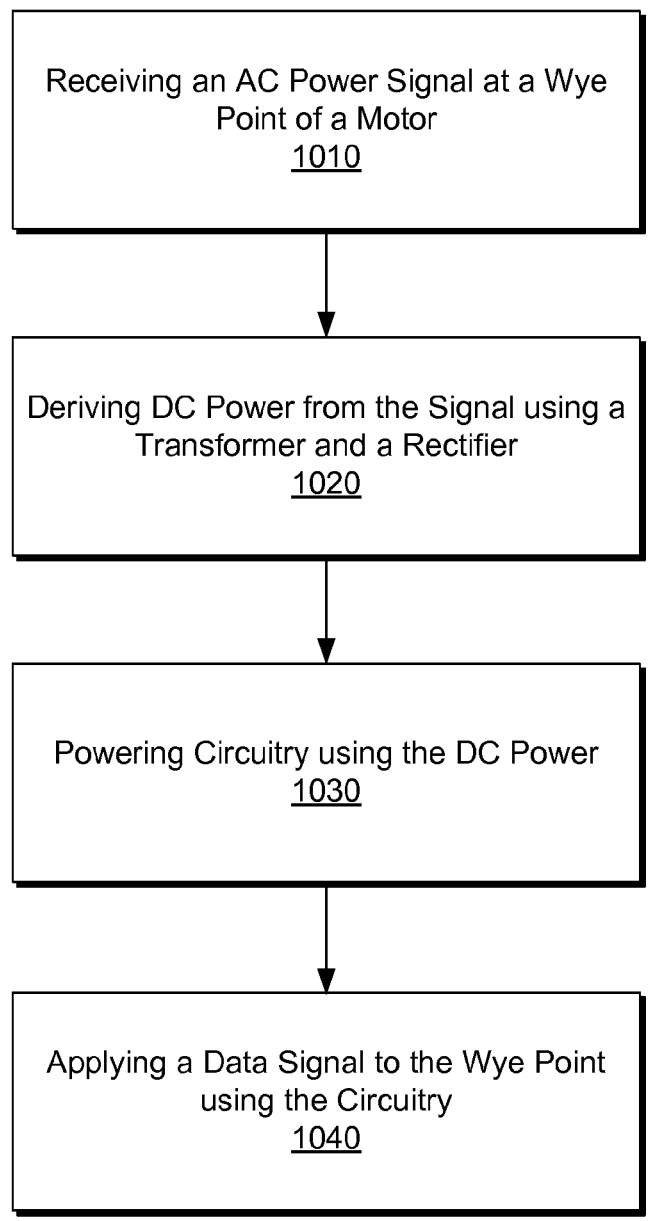
FIG. 10 illustrates an example of a method.

FIG. 10 shows an example of a method 1000. As shown, the method 1000 includes receiving an AC power signal at a wye point of a motor 1010, deriving DC power from the signal using a transformer and a rectifier 1020, powering circuitry using the DC power 1030, and applying a data signal to the wye point using the circuitry 1040.

As an example, a method can include: receiving an AC power signal at a wye point of an electric motor; deriving DC power from the AC power signal using a transformer and a rectifier; powering circuitry using the derived DC power; and applying a data signal to the wye point using the circuitry. In such a method, powering the circuitry can include powering one or more sensors and powering a telemetry driver, where powering the one or more sensors includes outputting a sensor signal, and where powering a telemetry driver includes generating the data signal based at least in part on the sensor signal. As an example, applying a data signal to the wye point can include transmitting the data signal from one winding of a transformer to another winding of the transformer. As an example, such a transformer may be double transformer or another transformer.

Methods described herein may include associated computer-readable media (CRM) blocks. Such blocks can include instructions suitable for execution by one or more processors (or cores) to instruct a computing device or system to perform one or more actions. As an example, a computer-readable medium may be a computer-readable storage medium such as, for example, a memory storage device.

According to an embodiment, one or more computer-readable storage media may include computer-executable instructions to instruct a computing system to output information for controlling a process. For example, such instructions may provide for output to sensing process, an injection process, drilling process, an extraction process, etc.

Figure 11:
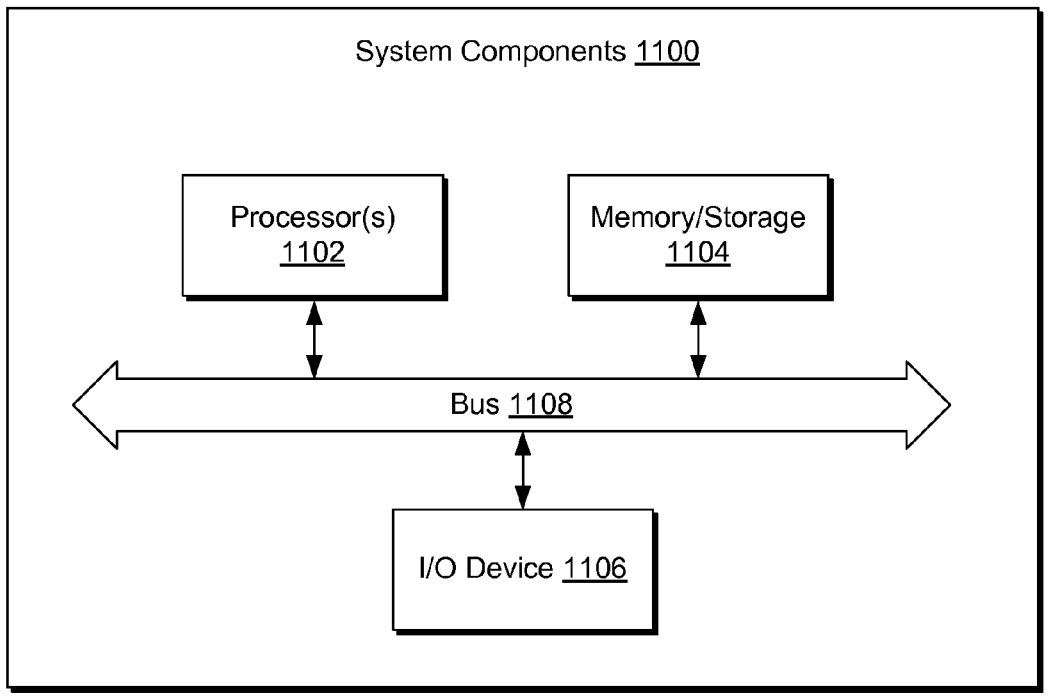
FIG. 11 illustrates example components of a system and a networked system.
Figure 11:
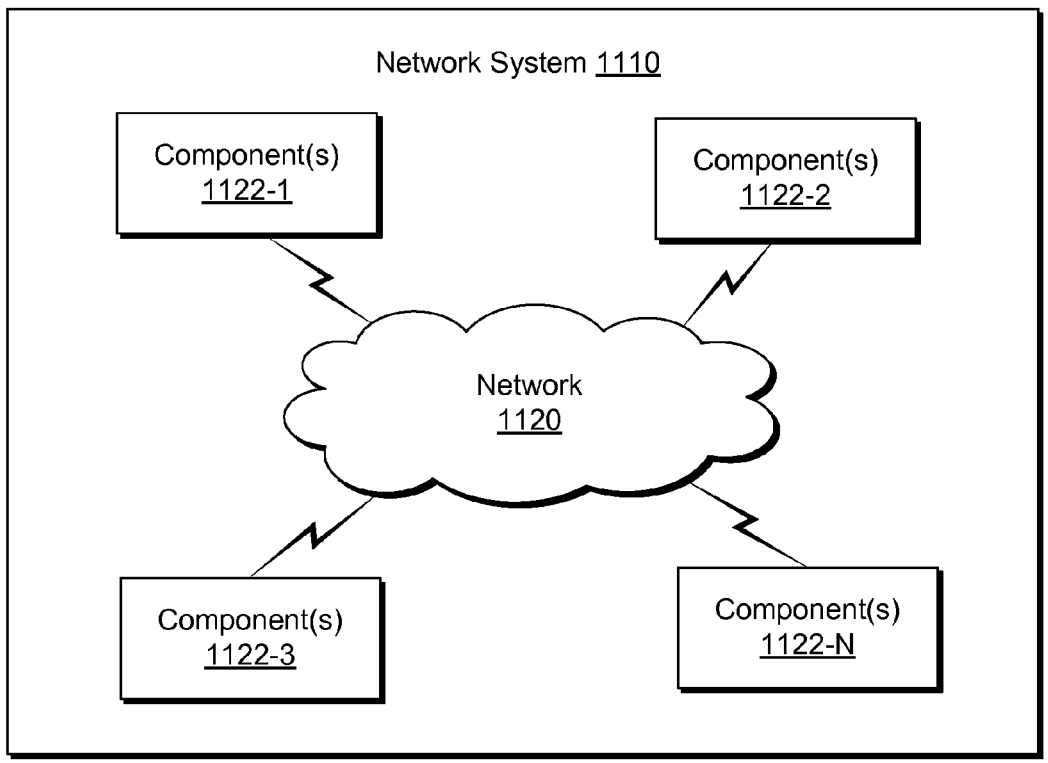

FIG. 11 shows components of a computing system 1100 and a networked system 1110. The system 1100 includes one or more processors 1102, memory and/or storage components 1104, one or more input and/or output devices 1106 and a bus 1108. According to an embodiment, instructions may be stored in one or more computer-readable media (e.g., memory/storage components 1104). Such instructions may be read by one or more processors (e.g., the processor(s) 1102) via a communication bus (e.g., the bus 1108), which may be wired or wireless. The one or more processors may execute such instructions to implement (wholly or in part) one or more attributes (e.g., as part of a method). A user may view output from and interact with a process via an I/O device (e.g., the device 1106). According to an embodiment, a computer-readable medium may be a storage component such as a physical memory storage device, for example, a chip, a chip on a package, a memory card, etc.

According to an embodiment, components may be distributed, such as in the network system 1110. The network system 1410 includes components 1122-1, 1122-2, 1122-3, . . . 1122-N. For example, the components 1122-1 may include the processor(s) 1402 while the component(s) 1122-3 may include memory accessible by the processor(s) 1102. Further, the component(s) 1102-2 may include an I/O device for display and optionally interaction with a method. The network may be or include the Internet, an intranet, a cellular network, a satellite network, etc.

Conclusion

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

The invention claimed is:

1. A system comprising:
an electric submersible pump that comprises an electric motor having a wye point;
a power cable that comprises three conductors, each of the three conductors electrically connected to the electric motor;
a telemetry driver powered by DC power that comprises at least one electrical connection to the power cable;
a sensor;
a transformer that comprises two opposing windings wherein one of the windings passes DC power from the wye point to power the telemetry driver and the other one of the windings provides stepped down AC power from the wye point for conversion to DC power to power the telemetry driver; and
circuitry responsive to detection of a ground fault to selectively convert the stepped down AC power to DC power to power the telemetry driver.

2. The system of claim 1 further comprising a DC-DC converter to receive DC power passed by the one of the windings and to receive DC power converted from the stepped down AC power.

3. The system of claim 1 wherein the sensor comprises a sensor signal output to output a sensor signal and wherein the system further comprises a controller that comprises acquisition circuitry to acquire a sensor signal from the sensor signal output and wherein an input of the telemetry driver receives the sensor signal from the controller.

4. The system of claim 3 wherein the controller comprises encoding circuitry to encode the sensor signal and wherein the sensor signal received by the telemetry driver comprises an encoded sensor signal.

5. The system of claim 1 wherein the telemetry driver comprises carrier signal circuitry to generate a carrier signal, wherein the carrier signal comprises circuitry to generate a carrier signal that comprises a frequency greater than an operating frequency of the electric motor.

6. The system of claim 1 further comprising circuitry to deliver a data signal representing the sensor signal to the wye point of the electric motor.

7. The system of claim 6 wherein the circuitry to deliver the data signal representing the sensor signal to the wye point of the electric motor comprises a transformer.

8. The system of claim 6 wherein the circuitry to deliver the data signal representing the sensor signal to the wye point of the electric motor comprises a capacitor disposed between the telemetry driver and the wye point.

9. The system of claim 6 wherein the transformer comprises a double transformer and wherein the circuitry to deliver the data signal representing the sensor signal to the wye point of the electric motor comprises a winding of the double transformer.

10. The system of claim 1 further comprising circuitry to selectively use the transformer and the rectifier to derive DC power from AC power at the wye point of the electric motor.

11. A system comprising:

circuitry to determine one or more power signal characteristics at a wye point of an electric motor of an electric submersible pump;

circuitry responsive to the determined one or more power signal characteristics to automatically provide DC power from the wye point or to automatically derive DC from AC power from the wye point; and circuitry responsive to detection of a ground fault comprising circuitry to selectively provide DC power from the wye point and to automatically derive DC power from AC power from the wye point.

\* \* \* \* \*